(12) United States Patent
Fu et al.

(10) Patent No.: US 7,328,080 B2
(45) Date of Patent: Feb. 5, 2008

(54) MANUFACTURING METHODS AND SYSTEMS FOR RAPID PRODUCTION OF HEARING-AID SHELLS

(75) Inventors: Ping Fu, Chapel Hill, NC (US); Dmitry Nekhayev, Durham, NC (US); Herbert Edelsbrunner, Chapel Hill, NC (US); G. Yates Fletcher, Cary, NC (US); Tobias Gloth, Durham, NC (US)

(73) Assignee: Phonak Ltd., Stafa (CH)

( * ) Notice: Subject to any disclaimer, the term of this patent is extended or adjusted under 35 U.S.C. 154(b) by 1352 days.

(21) Appl. No.: 10/162,434

(22) Filed: Jun. 3, 2002

(65) Prior Publication Data

US 2003/0074174 A1    Apr. 17, 2003

Related U.S. Application Data

(63) Continuation-in-part of application No. PCT/US01/42498, filed on Oct. 5, 2001, which is a continuation-in-part of application No. 09/684,184, filed on Oct. 6, 2000, now Pat. No. 7,050,876.

(51) Int. Cl.
    *G06F 19/00*    (2006.01)
(52) U.S. Cl. .......... 700/118; 700/98; 700/163; 700/182; 715/700; 345/420; 703/73
(58) Field of Classification Search .......... 700/118, 700/163, 182; 345/420; 715/700; 703/13
See application file for complete search history.

(56) References Cited

U.S. PATENT DOCUMENTS

| 4,569,812 A | 2/1986 | Werwath et al. .......... 264/222 |
| 4,652,414 A | 3/1987 | Schlaegel .................. 264/154 |

(Continued)

FOREIGN PATENT DOCUMENTS

JP    62-032800    2/1987

(Continued)

OTHER PUBLICATIONS

Chen et al., "Surface modeling of range data by constrained triangulation," Computer Aided Design, vol. 26, No. 8, Aug. 1994, pp. 632-645.

(Continued)

*Primary Examiner*—Kidest Bahta
*Assistant Examiner*—Douglas S Lee
(74) *Attorney, Agent, or Firm*—Pearne & Gordon LLP

(57) ABSTRACT

Methods, apparatus and computer program products provide efficient techniques for designing and printing shells of hearing-aid devices with a high degree of quality assurance and reliability and with a reduced number of manual and time consuming production steps and operations. These techniques also preferably provide hearing-aid shells having internal volumes that can approach a maximum allowable ratio of internal volume relative to external volume. These high internal volumes facilitate the inclusion of hearing-aid electrical components having higher degrees of functionality and/or the use of smaller and less conspicuous hearing-aid shells. A preferred method includes operations to generate a watertight digital model of a hearing-aid shell by thickening a three-dimensional digital model of a shell surface in a manner that eliminates self-intersections and results in a thickened model having an internal volume that is a high percentage of an external volume of the model. This thickening operation preferably includes nonuniformly thickening the digital model of a shell surface about a directed path that identifies a location of an undersurface hearing-aid vent. This directed path may be drawn on the shell surface by a technician (e.g., audiologist) or computer-aided design operator, for example. Operations are then preferably performed to generate a digital model of an undersurface hearing-aid vent in the thickened model of the shell surface, at a location proximate the directed path.

36 Claims, 18 Drawing Sheets

U.S. PATENT DOCUMENTS

| | | | |
|---|---|---|---|
| 4,719,585 A | 1/1988 | Cline et al. | 364/518 |
| 4,870,688 A | 9/1989 | Voroba et al. | 381/60 |
| 5,056,204 A | 10/1991 | Bartschi | 29/169.5 |
| 5,084,224 A | 1/1992 | Watters | 264/155 |
| 5,121,333 A | 6/1992 | Riley et al. | 364/474.05 |
| 5,357,576 A | 10/1994 | Arndt | 381/68.6 |
| 5,398,193 A | 3/1995 | deAngelis | 364/468 |
| 5,487,012 A * | 1/1996 | Topholm et al. | 700/163 |
| 5,587,913 A | 12/1996 | Abrams et al. | 364/468.26 |
| 5,600,060 A | 2/1997 | Grant | 73/147 |
| 5,617,322 A | 4/1997 | Yokota | 364/468.04 |
| 5,621,648 A | 4/1997 | Crump | 364/468.19 |
| 5,760,783 A | 6/1998 | Migdal et al. | 345/473 |
| 5,850,229 A | 12/1998 | Edelsbrunner et al. | 345/473 |
| 5,866,058 A | 2/1999 | Batchelder et al. | 264/237 |
| 5,875,254 A | 2/1999 | Hanright | 381/329 |
| 5,886,702 A | 3/1999 | Migdal et al. | 345/423 |
| 5,889,874 A | 3/1999 | Schmitt et al. | 381/328 |
| 5,915,031 A | 6/1999 | Hanright | 381/323 |
| 5,939,008 A | 8/1999 | Comb et al. | 264/308 |
| 5,948,342 A | 9/1999 | Nakazawa et al. | 264/400 |
| 5,968,561 A | 10/1999 | Batchelder et al. | 425/375 |
| 5,995,650 A | 11/1999 | Migdal et al. | 345/154 |
| 6,022,311 A | 2/2000 | Juneau et al. | 600/25 |
| 6,044,170 A | 3/2000 | Migdal et al. | 382/154 |
| 6,069,963 A | 5/2000 | Martin et al. | 381/313 |
| 6,100,893 A * | 8/2000 | Ensz et al. | 345/420 |
| 6,103,156 A | 8/2000 | Holtzberg | 264/102 |
| 6,108,006 A | 8/2000 | Hoppe | 345/423 |
| 6,110,409 A | 8/2000 | Allanic et al. | 264/401 |
| 6,133,921 A * | 10/2000 | Turkiyyah et al. | 345/420 |
| 6,167,138 A | 12/2000 | Shennib | 381/60 |
| 6,176,427 B1 | 1/2001 | Antognini et al. | 235/454 |
| 6,205,243 B1 | 3/2001 | Migdal et al. | 382/154 |
| 6,208,347 B1 | 3/2001 | Migdal et al. | 345/419 |
| 6,256,038 B1 | 7/2001 | Krishnamurthy | 345/419 |
| 6,256,039 B1 | 7/2001 | Krishnamurthy | 345/420 |
| 6,271,856 B1 | 8/2001 | Krishnamurthy | 345/429 |
| 6,285,372 B1 | 9/2001 | Cowsar et al. | 345/425 |
| 6,374,198 B1 | 4/2002 | Schifa | 703/2 |
| 6,377,865 B1 | 4/2002 | Edelsbrunner et al. | |
| 6,401,859 B1 | 6/2002 | Widmer et al. | 181/135 |
| 6,420,698 B1 | 7/2002 | Dimsdale | 250/234 |
| 6,484,842 B1 | 11/2002 | Widmer et al. | 181/129 |
| 6,496,587 B1 | 12/2002 | Mueller | 381/330 |
| 6,512,993 B2 | 1/2003 | Kacyra | 702/159 |
| 6,532,299 B1 | 3/2003 | Sachdeva | 382/124 |
| 6,545,676 B1 | 4/2003 | Ryan | 345/423 |
| 2002/0006217 A1 | 1/2002 | Rubbert | 382/131 |
| 2002/0059042 A1 | 5/2002 | Kacyra | 702/152 |
| 2002/0114537 A1 | 8/2002 | Sutula, Jr. | 382/285 |
| 2002/0136420 A1 | 9/2002 | Topholm | 381/312 |
| 2002/0138237 A1 | 9/2002 | Topholm | 703/1 |
| 2002/0145607 A1 | 10/2002 | Dimsdale | 345/423 |
| 2002/0158880 A1 | 10/2002 | Williams | 345/582 |
| 2002/0176584 A1 | 11/2002 | Kates | 381/60 |
| 2002/0196954 A1 | 12/2002 | Marxen et al. | 381/312 |
| 2002/0198437 A1 | 12/2002 | Juneau et al. | 600/25 |
| 2003/0001835 A1 | 1/2003 | Dimsdale | 345/419 |
| 2003/0021434 A1 | 1/2003 | Hessel et al. | 381/312 |
| 2003/0034976 A1 | 2/2003 | Raskar | 345/427 |
| 2003/0058242 A1 | 3/2003 | Redlich | 345/427 |
| 2003/0067461 A1 | 4/2003 | Fletcher et al. | |
| 2003/0071194 A1 | 4/2003 | Mueller | 250/208.1 |
| 2003/0072011 A1 | 4/2003 | Shirley | 356/601 |
| 2003/0074174 A1* | 4/2003 | Fu et al. | 703/13 |

FOREIGN PATENT DOCUMENTS

| | | |
|---|---|---|
| JP | 09-103000 | 4/1997 |
| JP | 091030000 A | 4/1997 |
| JP | 11055796 A | 2/1999 |
| WO | WO 85/04779 | 10/1985 |
| WO | WO 92/03894 | 3/1992 |
| WO | WO 92/11737 | 7/1992 |
| WO | WO92/11737 | 7/1992 |
| WO | WO 00/08895 | 2/2000 |
| WO | WO 00/19769 | 4/2000 |
| WO | WO 00/19935 | 4/2000 |
| WO | WO 00/34739 | 6/2000 |
| WO | WO 00/36564 | 6/2000 |
| WO | WO 00/70911 | 11/2000 |
| WO | WO 00/76268 | 12/2000 |
| WO | WO 01/05207 | 1/2001 |
| WO | WO01/52737 A1 | 1/2001 |
| WO | WO01/87001 A2 | 7/2001 |
| WO | WO01/87001 A3 | 7/2001 |
| WO | WO 02/30157 | 4/2002 |
| WO | WO02/071794 A1 | 9/2002 |
| WO | WO03/027961 | 4/2003 |

OTHER PUBLICATIONS

Dey et al., "Delaunay Based Shape Reconstruction from Large Data," Proceedings IEEE 2001 Symposium on Parallel and Large-Data Visualization and Graphics, Oct. 22-23, 2001, pp. 19-27.

Mencl et al., "Graph-Based Surface Reconstruction Using Structures in Scattered Point Sets," Computer Graphics International, Proceedings Hannover, Germany, Jun. 22-26, 1998, pp. 298-311.

Chen et al., "Wing Representation for Rigid 3D Objects," Proceedings of the International Conference on Pattern Recognition, Atlantic City, Jun. 16-21, 1990, pp. 398-402.

International Search Report, PCT/US02/24220, May 22, 2003.

"A Volumetric Method for Building Complex Models from Range Images," Curless et al., Computer Graphics Proceedings, Annual Conference Series, Aug. 1996, pp. 303-312.

"Automatic Reconstruction of B-Spline Surfaces of Arbitrary Topological Type," Eck et al., Computer Graphics Proceedings, Annual Conference Series, Aug. 1996, pp. 325-334.

"Automatic Reconstruction of Surfaces and Scalar Fields from 3D Scans," Bajaj et al., Computer Graphics Proceedings, Annual Conference Series, 1995, pp. 109-118.

"Closed Object Boundaries From Scattered Points," Remco Coenraad Veltkamp, Proefschrift Rotterdam, Netherlands, 1991, pp. 1-149.

"Computing Dirichlet tessallations," Bowyer, The Computer Journal, vol. 24, No. 2, 1981, pp. 162-166.

"Construction of three-dimensional Delaunay triangulations using local transformations," Joe, Computer Aided Geometric Design, vol. 8, 1999, pp. 123-142.

"C-Surface Splines," Peters, Society for Industrial and Applied Mathematics, vol. 32, No. 2, 1995, pp. 645-666.

"Fitting Smooth Surfaces to Dense Polygon Meshes," Krishnamurthy et al., SIGGRAPH 96, New Orleans, Louisiana, Aug. 4-9, 1996, pp. 313-324.

"Geometric Structures for Three-Dimensional Shape Representation," Boissonnat, ACM Transactions on Graphics, vol. 3, No. 4, Oct. 1984, pp. 267-286.

"Incremental Topological Flipping Works for Regular Triangulations," Edelsbrunner et al., Algorithmica, 1996, pp. 223-241.

"Mesh Optimization," Hoppe et al., Computer Graphics Proceedings, Annual Conference Series, 1993, pp. 19-26.

"Modeling With Cubic A-Patches," Bajaj et al., ACM Transactions on Graphics, vol. 14, No. 2, Apr. 1995, pp. 103-133.

"Optimal Surface Reconstruction From Planar Contours," Fuchs et al., Communications, vol. 20, Oct. 1977, pp. 693-702.

"Piecewise Smooth Surface Reconstruction," Hoppe et al., Computer Graphics Proceedings, Annual Conference Series, 1994, pp. 295-302.

"Piecewise-Linear Interpolation Between Polygonal Slices," Barequet et al., Computer Vision and Image Understanding, vol. 63, No. 2, Mar. 1996, pp. 251-272.

"Shape Reconstruction From Planar Cross Sections," Boissonnat, Computer Vision, Graphics and Image Processing, vol. 44, 1988, pp. 1-29.

"Smooth Spline Surfaces Over Irregular Meshes," Loop, Computer Graphics Proceedings, Annual Conference Series, 1994, pp. 303-310.

"Surface Reconstruction From Unorganized Points," Hoppe et al. Computer Graphics, vol. 26, Jul. 1992, pp. 71-78.

"Surfaces From Contours," Meyers et al., ACM Transactions on Graphics, vol. 11, No. 3, Jul. 1992, pp. 228-258.

"Three-Dimensional Alpha Shapes," Edelsbrunner et al., ACM Transactions on Graphics., vol. 13, No. 1, Jan. 1994, pp. 43-72.

Zomorodian et al., "Fast Software for Box Intersections," International Journal of Computational Geometry & Applications, World Scientific Publishing Company, pp. 1-30.

Patent Abstracts of Japan. "Manufacture of Shell for Hering Aid and the Like," publication No. 09-023500, publication date: Jan. 21, 1997, application No. 07-171664, date of filing: Jul. 7, 1995, Inventor: Sawai Masashi et al.

Patent Abstracts of Japan. "Manufacture of Shell for Hearing Aid," publication No. 11-055797, publication date: Feb. 26, 1999, application No. 09-206382, date of filing Jul. 31, 1997, Inventor: Itedan Iwao.

* cited by examiner

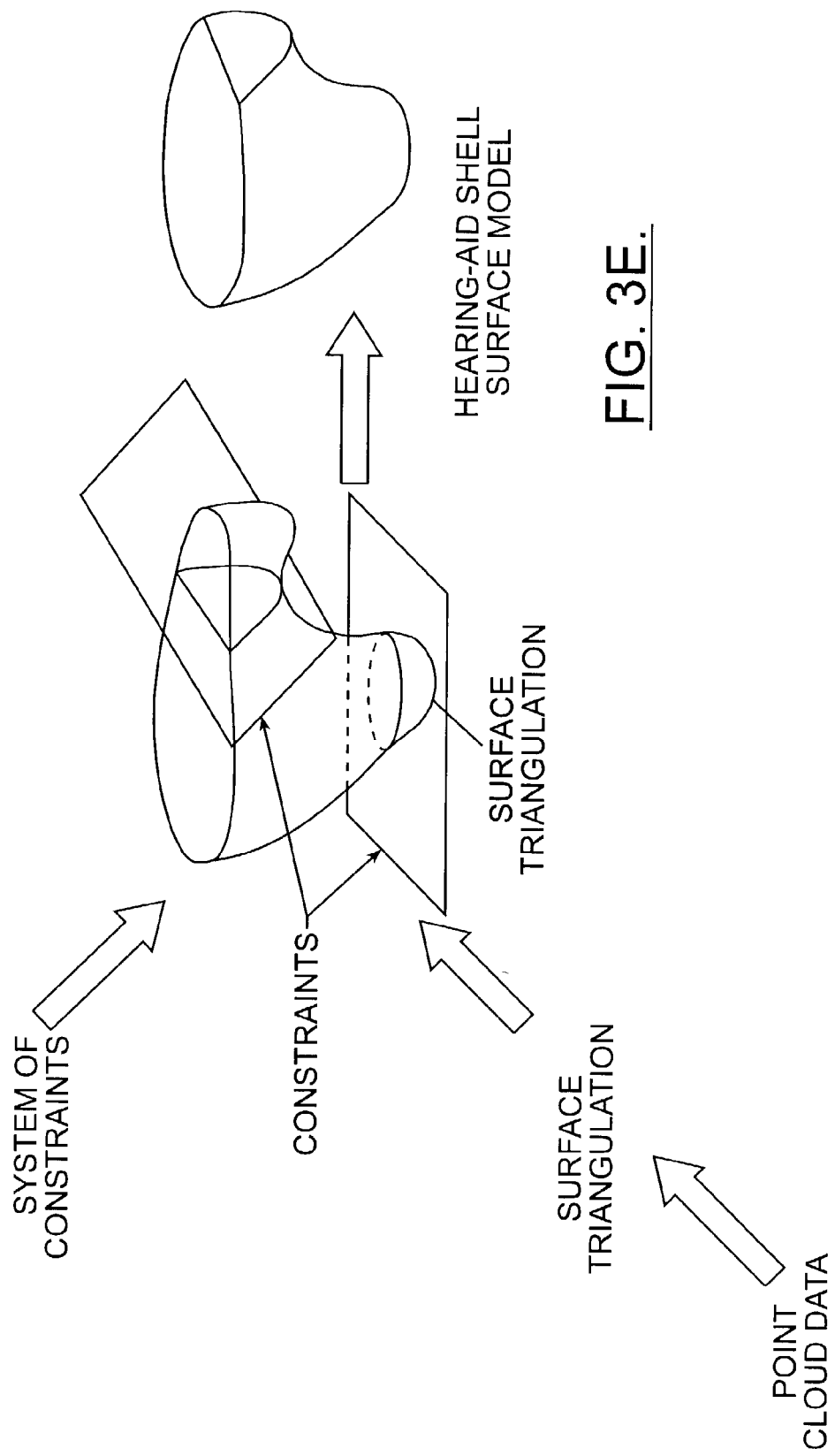

MANUFACTURING METHODS AND SYSTEMS FOR RAPID PRODUCTION OF HEARING-AID SHELLS

CROSS-REFERENCE TO PRIORITY APPLICATION

This application is a continuation-in-part of PCT Application Serial No. PCT/US01/42498, filed Oct. 5, 2001, published in English as International Publication No. WO 02/30157 on Apr. 11, 2002, which is a continuation-in-part of U.S. application Ser. No. 09/684,184, filed Oct. 6, 2000, now U.S. Pat. No. 7,050,876, the disclosures of which are hereby incorporated herein by reference.

FIELD OF THE INVENTION

This invention relates to manufacturing methods and systems that utilize computer-aided-design (CAD) and computer-aided manufacturing (CAM) techniques and, more particularly, to manufacturing methods and systems for production of custom medical devices.

BACKGROUND OF THE INVENTION

Techniques for designing and manufacturing in-ear hearing-aid devices typically need to be highly customized in both internal dimensions to support personalized electrical components to remedy a individual's particular hearing loss need, and in external dimensions to fit comfortably and securely within an ear canal of the individual. Moreover, cosmetic considerations also frequently drive designers to smaller and smaller external dimensions while considerations of efficacy in hearing improvement typically constrain designers to certain minimal internal dimensions notwithstanding continued miniaturization of the electrical components.

FIG. 1 illustrates a conventional production process flow 10 for manufacturing customized in-ear hearing-aid devices. As illustrated by Block 12, a positive mold of an ear canal of a subject is generated along with a negative mold that may be used for quality assurance by acting as the "ear" of the subject when testing a finally manufactured hearing-aid shell. As will be understood by those familiar with conventional hearing-aid manufacturing techniques, the positive mold may be generated by an audiologist after performing a routine hearing examination of the subject and the negative mold may be generated by a manufacturer that has received the positive mold and a request to manufacture a customized hearing-aid shell. Referring now to Block 14, a detailed positive mold of a hearing-aid shell may then be generated by the manufacturer. This detailed positive mold may be generated by manually sculpting the positive mold to a desired size suitable for receiving the necessary electrical components to remedy the defective auditory condition of the subject. A detailed shell cast is then formed from the detailed positive mold, Block 16, and this shell cast is used to form a plastic hearing-aid shell, Block 18.

As illustrated by Block 20, a vent structure may then be attached (e.g., glued) to an inner surface of the plastic hearing-aid shell. Manual trimming and surface smoothing operations may then be performed, Block 22, so that the shell is ready to receive a faceplate. The faceplate may then be attached to a flat surface of the shell and then additional trimming and smoothing operations may be performed to remove abrupt edges and excess material, Block 24. The electrical components may then be added to the shell, Block 26, and the shape of the resulting shell may be tested using the negative mold, Block 28. A failure of this test typically causes the manufacturing process to restart at the step of generating a detailed positive mold, Block 14. However, if the manufactured shell passes initial quality assurance, then the shell with electrical components may be shipped to the customer, Block 30. Steps to fit and functionally test the received hearing-aid shell may then be performed by the customer's audiologist. A failure at this stage typically requires the repeat performance of the process flow 10 and the additional costs and time delay associated therewith.

Unfortunately, these conventional techniques for designing and manufacturing customized in-ear hearing-aid devices typically involve a large number of manual operations and have a large number of drawbacks. First, manual hearing-aid shell creation through sculpting is error prone and considered a main contributor in a relatively high customer rejection rate of 20 to 30%. Second, the typically large number of manual operations that are required by conventional techniques frequently act as a bottleneck to higher throughput and often limit efforts to reduce per unit manufacturing costs. Accordingly, there exists a need for more cost effective manufacturing operations that have higher throughput capability and can achieve higher levels of quality assurance.

SUMMARY OF THE INVENTION

Methods, apparatus and computer program products of the present invention provide efficient techniques for designing and printing shells of hearing-aid devices with a high degree of quality assurance and reliability and with a reduced number of manual and time consuming production steps and operations. These techniques also preferably provide hearing-aid shells having internal volumes that can approach a maximum allowable ratio of internal volume relative to external volume. These high internal volumes facilitate the inclusion of hearing-aid electrical components having higher degrees of functionality and/or the use of smaller and less conspicuous hearing-aid shells.

A first preferred embodiment of the present invention includes operations to generate a watertight digital model of a hearing-aid shell by thickening a three-dimensional digital model of a shell surface in a manner that preferably eliminates self-intersections and results in a thickened model having an internal volume that is a high percentage of an external volume of the model. This thickening operation preferably includes nonuniformly thickening the digital model of a shell surface about a directed path that identifies a location of an undersurface hearing-aid vent. This directed path may be drawn on the shell surface by a technician (e.g., audiologist) or computer-aided design operator, for example. Operations are then preferably performed to generate a digital model of an undersurface hearing-aid vent in the thickened model of the shell surface, at a location proximate the directed path.

A second embodiment of the present invention includes operations to generate a first digital representation of a positive or negative image of at least a portion of an ear canal of a subject. The first digital representation is a representation selected from the group consisting of a point cloud representation, a 2-manifold triangulation, a 2-manifold with nonzero boundary triangulation and a volume triangulation. A second digital representation of a hearing-aid shell is then generated having a shape that conforms to the ear canal of the subject. This second digital representation may be derived directly or indirectly from at least a portion of the first digital representation. Operations are then performed to print a hearing-aid shell that conforms to the ear canal of the subject, based on the second digital representation. Templates may also be used to facilitate generation of the second digital representation. In particular, the operation to generate the second digital representation may comprise modifying a shape of the first digital representation to more closely conform to a shape of a digital template of a hearing-aid shell and/or modifying the shape of the digital template to more closely conform to the shape of the first digital representation. This digital template is preferably a surface triangulation that constitutes a 2-manifold with nonzero boundary. However, the digital template may be a three-dimensional model of a generic hearing-aid shell having a uniform or nonuniform thickness, and possibly even a vent.

The operation to generate a second digital representation may include operations to generate a three-dimensional model of a hearing-aid shell surface that is a 2-manifold or 2-manifold with nonzero boundary and then thicken the three-dimensional model of the hearing-aid shell surface using operations that move each of a plurality of vertices on the shell surface along a respective path that is normal to an inner shell surface. This thickening operation preferably includes an operation to nonuniformly thicken the three-dimensional model of the hearing-aid shell surface about a directed path thereon. A uniform thickening operation may then be performed along with an operation to generate an undersurface hearing-aid vent in the thickened model of the shell surface, at a location proximate the directed path. A combination of a local nonuniform thickening operation to enable vent formation followed by a global uniform thickening operation to define a desired shell thickness enables the formation of a custom hearing-aid shell having a relatively large ratio of interior volume to exterior volume and the printing of shells with built-in vents.

An additional embodiment of the present invention provides an efficient method of performing quality assurance by enabling a comparison between a digital model of a hearing-aid shell and a digital model of a printed and scanned hearing-aid shell. In particular, operations may be performed to generate a first three-dimensional digital model of a hearing-aid shell and then print a hearing-aid shell based on the first three-dimensional digital model. Point cloud data is then generated by scanning the printed hearing-aid shell. From this point cloud data, a second three-dimensional digital model of a hearing-aid shell surface is generated. To evaluate the accuracy of the printing process, the second three-dimensional digital model of a hearing-aid shell surface is digitally compared against the first three-dimensional digital model of a hearing-aid shell to detect differences therebetween. This second three-dimensional digital model may also be compared against earlier digital representations of the shell to verify various stages of the manufacturing process.

Still further embodiments of the present invention include operations to manufacture a hearing-aid shell by automatically generating a first three-dimensional digital model of a surface that describes a shape of an ear canal of a subject as a 2-manifold surface having zero or nonzero functional boundary, from captured three-dimensional data. This captured data may be generated in response to a scanning operation or other related data capture operation involving, for example, a three-dimensional digital camera. Such data capture operations will be referred to herein as scanning operations that generate scan data. These operations are followed by an operation to generate a second three-dimensional digital model of a thickened hearing-aid shell from the first three-dimensional digital model and then print the second three-dimensional digital model as a hearing-aid shell. Quality assurance operations may then be performed by comparing at least two of (i) the first three-dimensional digital model, (ii) the second three-dimensional digital model and (iii) a third three-dimensional digital model derived from the printed hearing-aid shell. This third three-dimensional digital model may be derived from a scan of the printed hearing-aid shell.

According to a preferred aspect of these embodiments, the step of generating a first three-dimensional digital model includes generating a point cloud representation of a non star-shaped surface that describes the shape of an ear canal of a subject, from multiple point sets that described respective portions of the non star-shape surface. An operation is then performed to automatically wrap the point cloud representation into a non star-shaped surface triangulation. The operations to generate a second three-dimensional digital model also preferably include performing a detailing operation by cutting and/or trimming the non star-shaped surface triangulation into a three-dimensional digital model of a star-shaped hearing-aid shell surface and then thickening the digital model of the star-shaped hearing-aid shell surface. The thickening operation may include defining a receiver hole and/or vent in the thickened digital model and fitting a digital faceplate to the thickened digital model. A printing operation may also be performed by printing a hearing-aid shell with integral faceplate using a printing tool. An exemplary printing tool may be one selected from the group consisting of a stereolithography tool and a rapid prototyping apparatus.

BRIEF DESCRIPTION OF THE DRAWINGS

FIG. 3E illustrates the use of a hearing-aid constraints to facilitate conversion of a surface triangulation into a shell surface model.

DESCRIPTION OF A PREFERRED EMBODIMENT

The present invention now will be described more fully hereinafter with reference to the accompanying drawings, in which preferred embodiments of the invention are shown. This invention may, however, be embodied in many different forms and applied to other articles and should not be construed as limited to the embodiments set forth herein; rather, these embodiments are provided so that this disclosure will be thorough and complete, and will fully convey the scope of the invention to those skilled in the art. The operations of the present invention, as described more fully hereinbelow and in the accompanying figures, may be performed by an entirely hardware embodiment or, more preferably, an embodiment combining both software and hardware aspects and some degree of user input. Furthermore, aspects of the present invention may take the form of a computer program product on a computer-readable storage medium having computer-readable program code embodied in the medium. Any suitable computer-readable medium may be utilized including hard disks, CD-ROMs or other optical or magnetic storage devices. Like numbers refer to like elements throughout.

Various aspects of the present invention are illustrated in detail in the following figures, including flowchart illustrations. It will be understood that each of a plurality of blocks of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each of a plurality of blocks of the flowchart illustrations, and combinations of blocks in the flowchart illustrations, can be implemented by special purpose hardware-based computer systems which perform the specified functions or steps, or by combinations of special purpose hardware and computer instructions.

Figure 2:
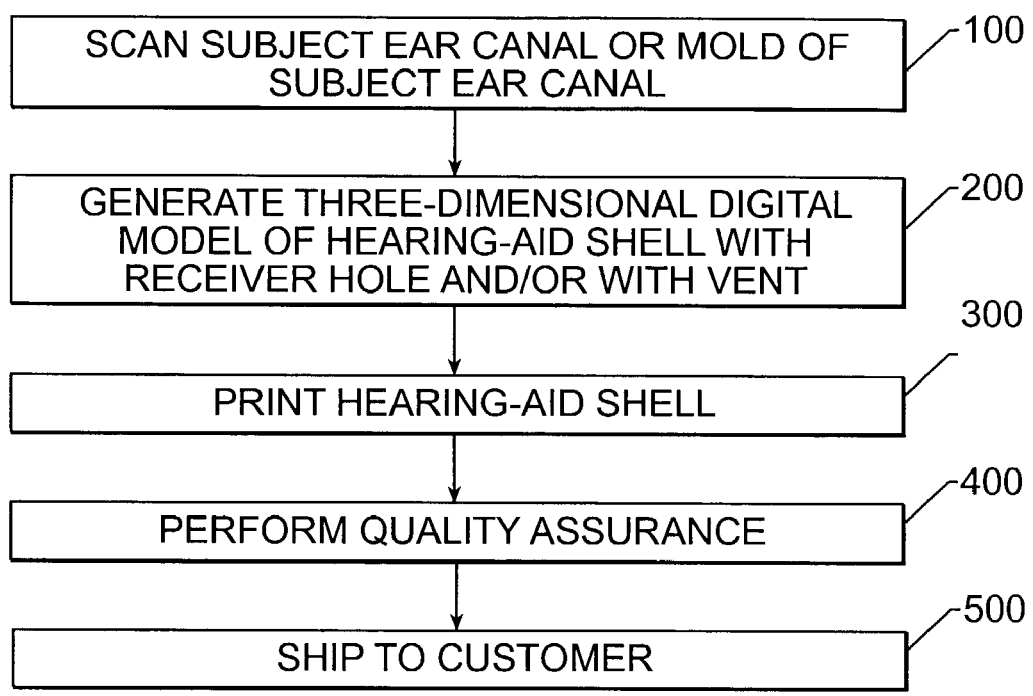
FIG. 2 is a high level flow diagram of operations that illustrate preferred methods of manufacturing hearing-aid shells in accordance with an embodiment of the present invention.

Referring now to FIG. 2, preferred manufacturing methods and systems for rapid production of hearing-aid shells may initially perform conventional operations 100 to (i) three-dimensionally scan an ear canal of a subject or a positive or negative mold of the ear canal of the subject, which may be a complex non star-shaped surface with one or more occlusions, and (ii) generate scan data that digitally describes a shape of at least a portion of the shape of the ear canal. This scan data may take the form of a point cloud data file with each data point being identified by its Cartesian coordinates. The data files may be provided in an ASCII xyz data format by conventional digitizers, including those manufactured by Cyberware™, Digibotics™, Laser Design™, Steinbichler™, Genex™ and Minolta™, for example. As will be understood by those skilled in the art of three-dimensional geometry, all closed 3D surfaces are either star-shaped or non star-shaped. Closed surfaces are "star" shaped if and only if there exists at least one point on the interior of the volume bounded by the closed surface from which all points on the surface are visible. All other surfaces are non star-shaped. Examples of star-shaped surfaces include a cube, a sphere and tetrahedron. Examples of non star-shaped surfaces include toroids (e.g, donut-shaped) and closed surfaces having tunnels and handles.

Figure 5:
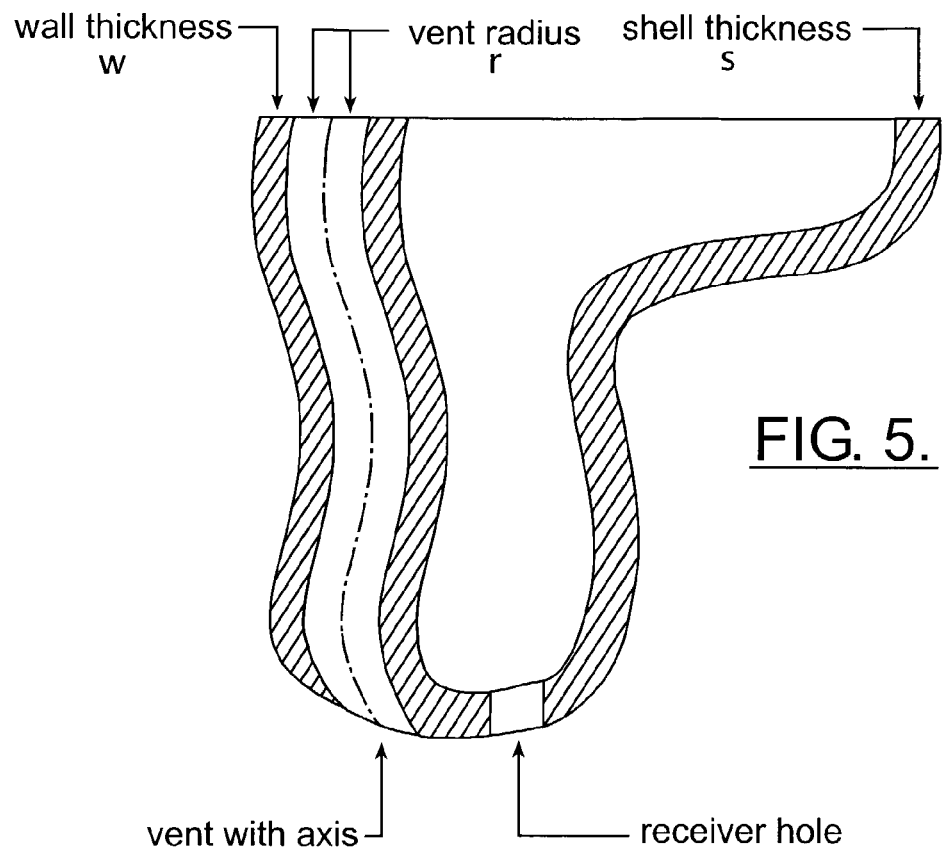
FIG. 5 is a cross-sectional view of a finished hearing-aid shell. The shaded area indicates wall and shell thickness. The vent is a relatively long tunnel routed through the shell. The receiver hole is a short tunnel.

As illustrated by Block 200, preferred automated operations are then performed to generate a three-dimensional digital model of a hearing-aid shell, preferably with receiver hole and vent, from the scan data. A cross-sectional view of an exemplary hearing-aid shell is illustrated by FIG. 5. Other in-the-ear shells that assist in hearing may also be modeled including those designed to support custom "ear" phones and custom cell phone receivers. Additional in-the-ear shells and devices, including those operating as ear molds that seal the ear canal against intrusion by water or sound, etc., during swimming or other activity, may also be modeled. Accordingly, reference herein to hearing-aid shells include other in-the-ear (ITE) shells and devices that may have medical or non-medical applications. These modeling operations may include initial operations to convert the point cloud data into a volume triangulation (e.g., tetrahedrized model) and then into a digital polygonal surface model, preferably a surface triangulation that models a shape of at least a portion of the ear canal of the subject. This may be done by removing all tetrahedra and retaining only the boundary of the volume model. Preferred examples of one or more aspects of these conversion operations are more fully described in commonly assigned U.S. application Ser. No. 09/248,587, filed Feb. 11, 1999, entitled "Methods of Generating Three-Dimensional Digital Models of Objects By Wrapping Point Cloud Data Points", now U.S. Pat. No. 6,377,865; and in U.S. application Ser. No. 09/607,122, filed Jun. 29, 2000, entitled "Methods, Apparatus and Computer Program Products for Automatically Generating Nurbs Models of Triangulated Surfaces Using Homeomorphisms", the disclosures of which are hereby incorporated herein by reference. As described more fully in the '587 application, the operations to generate a surface triangulation from the point cloud data are preferably automated and include processing the point cloud data using automated wrap operations. These automated wrap operations can operate independent of additional information in excess of the Cartesian coordinates of the points in the point cloud, to convert the point cloud data into the surface triangulation. This additional information may take the form of connectivity information that links points in the point cloud data by edges and triangles. Thus, the automated wrap operations may in a preferred embodiment rely exclusively on the Cartesian coordinates of the points in the point cloud, however, less preferred operations to process point cloud data with connectivity or other information may also be used. Additional automated wrap operations are disclosed in U.S. application Ser. No. 10/152,444, filed May 21, 2002, entitled "Methods, Apparatus and Computer Program Products That Reconstruct Surfaces from Data Point Sets," the disclosure of which is hereby incorporated herein by reference.

These conversion operations may also include techniques to generate a Delaunay complex of point cloud data points. Techniques to generate Delaunay complexes are more fully described in commonly assigned U.S. Pat. No. 5,850,229 to Edelsbrunner et al., entitled "Apparatus and Method for Geometric Morphing", the disclosure of which is hereby incorporated herein by reference. The conversion operations may also include point manipulation techniques such as "erase" for removing a set of selected points, "crop" for removing all selected points, "sample" for selecting a percentage of points and "add points" for adding points to the point set using a depth plane. The operations for creating polygonal models may use geometric techniques to infer the shape of the ear canal from a set of data points in a point cloud data file, by building a Wrap™ model of the point set using strict geometric rules to create a polygonal surface (e.g., triangulated surface) around the point set that actually passes through the points. These operations may be provided by commercially available software, Geomagic Wrap 4.1™, manufactured by Raindrop Geomagic, Inc. of Research Triangle Park, N.C., assignee of the present application.

Figure 1:
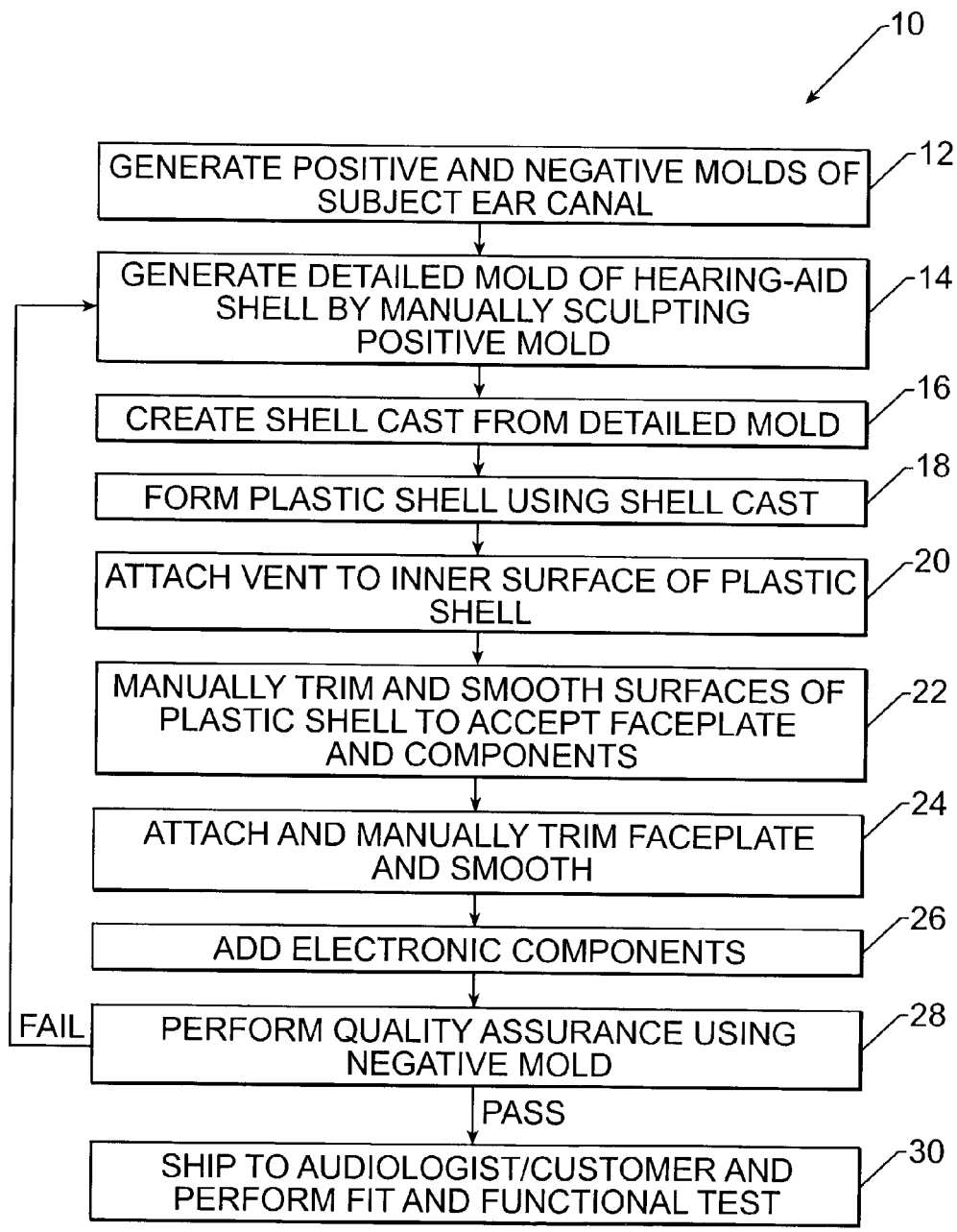
FIG. 1 is a flow diagram of a conventional production process flow for manufacturing customized in-ear hearing-aid devices.

As described more fully hereinbelow with respect to FIGS. 3-22 and 23-25, operations 200 to generate a three-dimensional digital model of a hearing-aid shell preferably include operations to thicken a three-dimensional model of a hearing-aid shell surface and then define and merge a digital model of a vent into the thickened three-dimensional model. Operations may then be performed to print a hearing-aid shell having a vent therein, based on the three-dimensional digital model of a hearing-aid shell, Block 300. Conventional operations may then be performed to assure quality, Block 400. More preferably, quality assurance operations may include operations to scan the printed hearing-aid shell and generate a three-dimensional model of the printed shell based on the scan. For quality assurance purposes, this three-dimensional model of the printed shell may be compared to the three-dimensional model of the hearing-aid shell generated at Block 200 in order to verify the accuracy of the printing process. Alternatively, or in addition, the overall automated design process may be verified by comparing the three-dimensional model of the printed shell to see if it conforms with the original surface triangulation that models a shape of the ear canal and was generated from the original scan data (e.g., point cloud data). The quality assurance operations 400 may also be preceded by conventional manual operations to attach a faceplate to the printed shell and add electronic components, such as those operations illustrated by Blocks 24 and 26 of FIG. 1. However, more preferred automated operations to attach, trim and finish a faceplate may be performed digitally during the operations for generating a three-dimensional digital model of a hearing-aid shell with vent, Block 200. Finally, as illustrated by Block 500, a finished hearing-aid is then shipped to the customer.

Figure 3A:
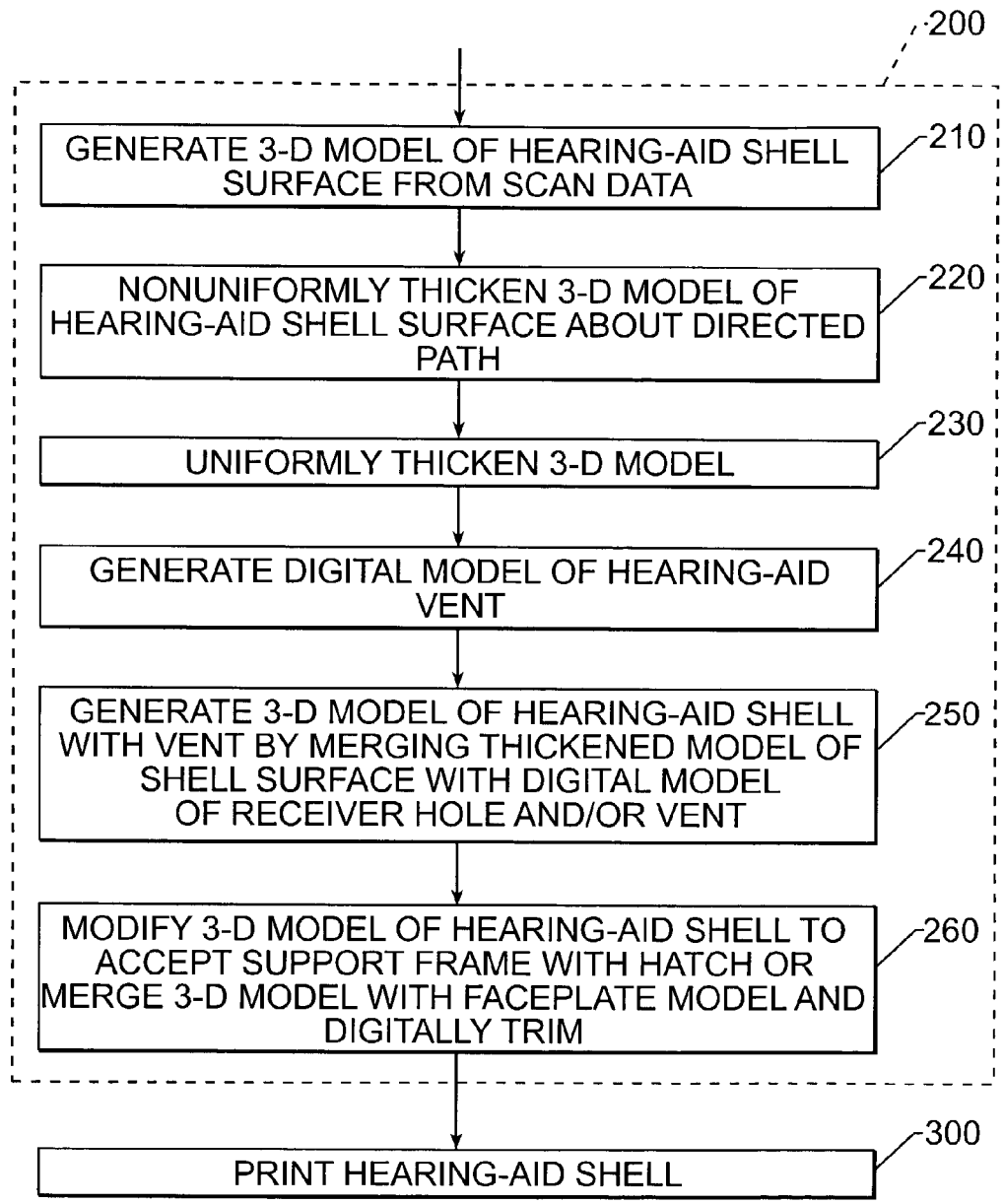
FIG. 3A is a flow diagram of operations that illustrates preferred methods of generating digital models of shells from scan data.
Figure 3B:
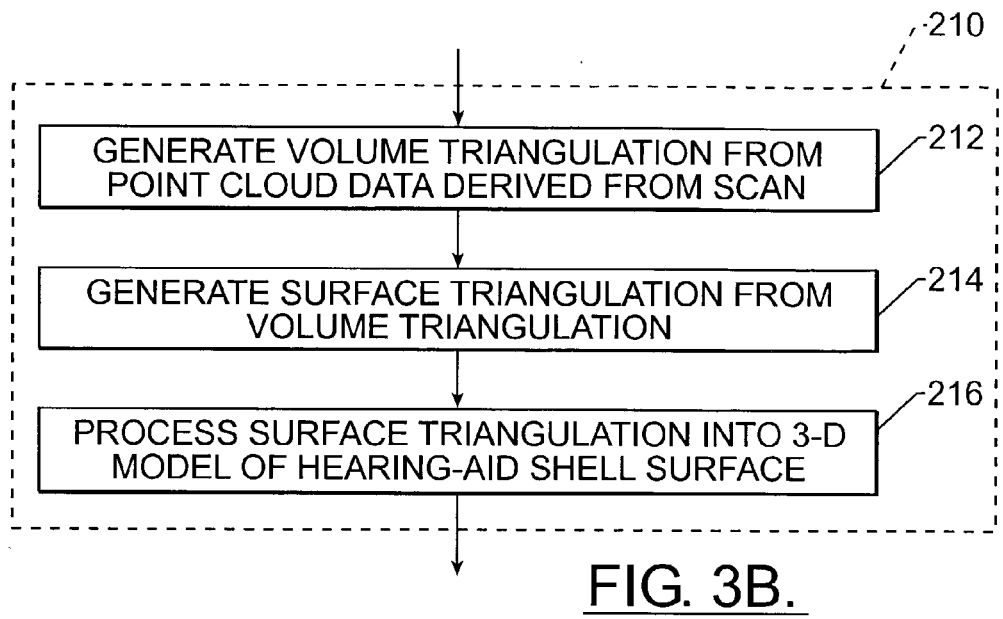
FIG. 3B is a flow diagram of operations that illustrates methods of converting scan data into three-dimensional models of hearing-aid shell surfaces.
Figure 6:
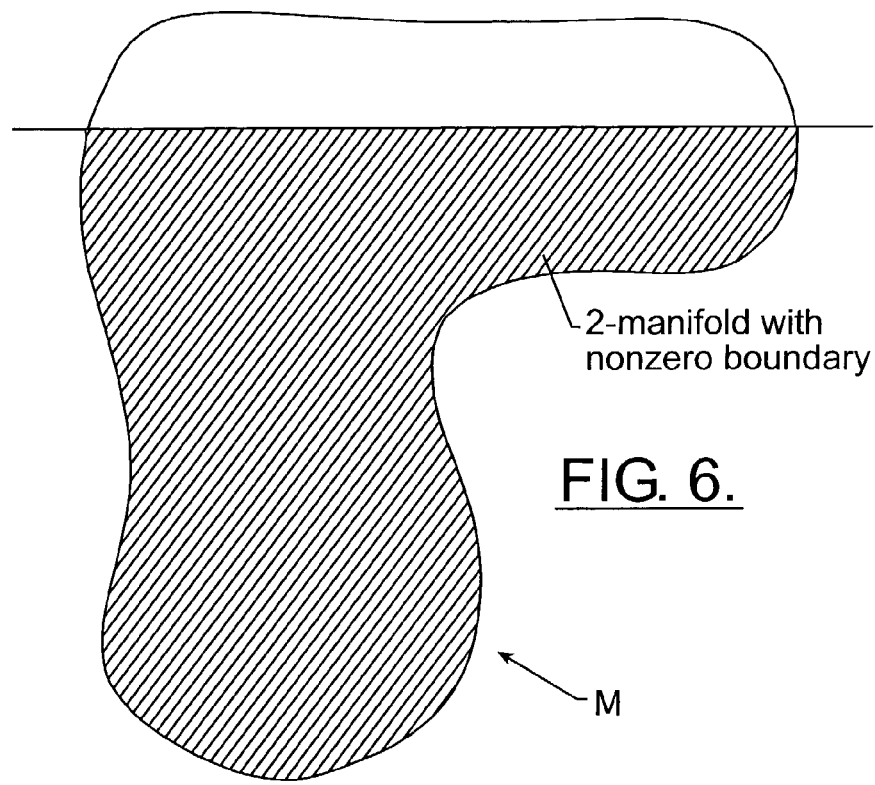
FIG. 6 is a side view of a 2-manifold M cut by a plane. The resulting 2-manifold with nonzero boundary is shaded.
Figure 7:
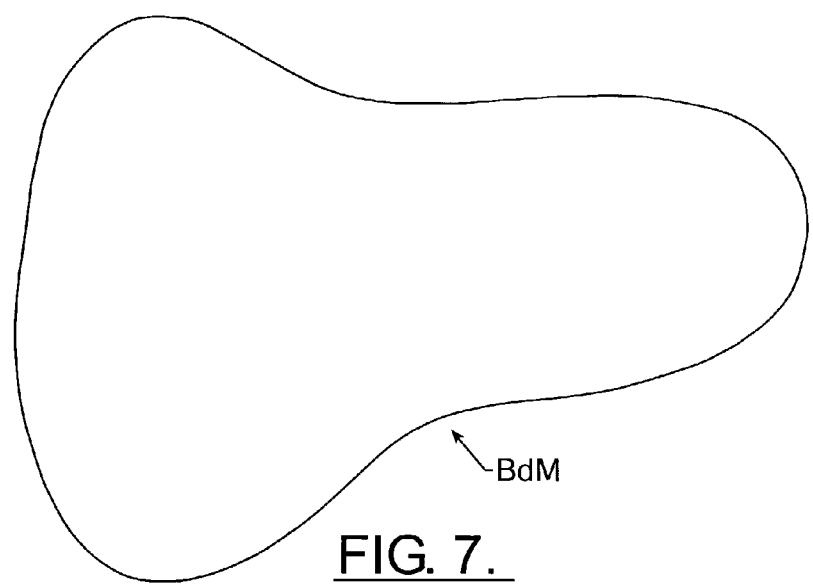
FIG. 7 is a top view of a 2-manifold with nonzero boundary showing only the boundary BdM.

Referring now to FIGS. 3A-3D, preferred operations 200 for generating a three-dimensional model of a hearing-aid shell with vent will now be described in greater detail. In particular, Block 210 illustrates an operation for generating a 3-D model of a hearing-aid shell surface from the scan data (e.g., point cloud data). As illustrated by FIG. 3B, this operation may include generating a volume triangulation from the point cloud data, Block 212, and then generating a surface triangulation as a 2-manifold or 2-manifold with nonzero boundary, Block 214. As described more fully hereinbelow with respect to FIGS. 23-34, the operations to generate a surface triangulation from point cloud data do not necessarily require an intermediate operation to generate a volume triangulation. To an operator of a computer-aided design tool, these operations of passing from scan data to a volume triangulation and then to a surface triangulation may be automatic. At this point, the surface triangulation may describe a substantially greater portion of the ear canal of the subject than is absolutely necessary to create a three-dimensional model of a hearing-aid shell surface. The operation of Blocks 212 and 214 may also be skipped in the event the surface triangulation is provided as an input file to a custom computer-aided design (CAD) workstation. A triangulated surface may be referred to as a 2-manifold if (i) every edge belongs to exactly two triangles, and (ii) every vertex belongs to a ring of triangles homeomorphic to a disk. Alternatively, a triangulated surface may be referred to as a 2-manifold with nonzero boundary if (i) every edge belongs to either one triangle or two triangles, and (ii) every vertex belongs to either a ring or an interval of triangles homeomorphic to a disk or half-disk. To illustrate, FIG. 6 provides a side view of a 2-manifold M cut by a plane. The resulting 2-manifold with nonzero boundary is shaded. FIG. 7 provides a top view of the 2-manifold with nonzero boundary illustrated by FIG. 6, with only the boundary BdM shown.

Figure 3C:
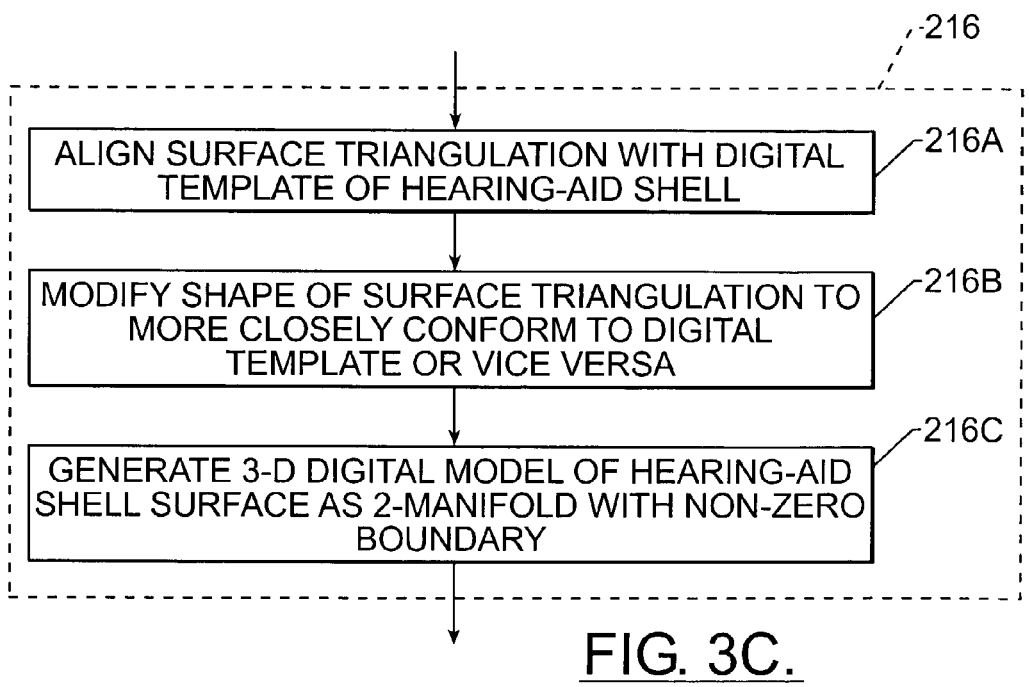
FIG. 3C is a flow diagram of operations that illustrates preferred methods of generating a three-dimensional model of a hearing-aid shell surface from a surface triangulation that describes a shape of an ear-canal of a subject.
Figure 3D:
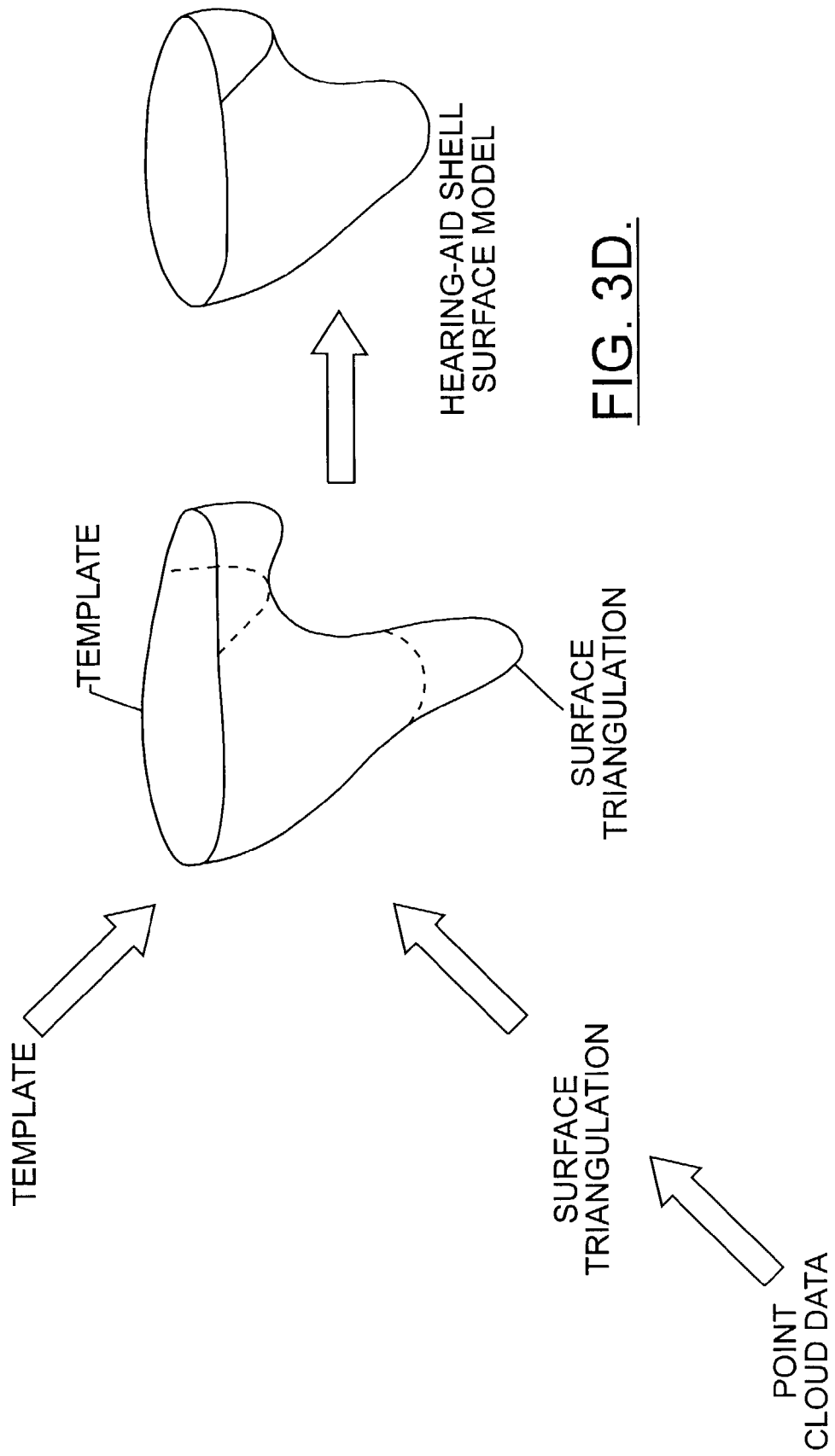
FIG. 3D illustrates the use of a hearing-aid template to facilitate conversion of a surface triangulation into a shell surface model.

Referring now to Block 216 of FIGS. 3B-3D, operations to process the surface triangulation into a three-dimensional model of a hearing-aid shell surface will be described. In particular, FIGS. 3C and 3D illustrate a preferred operation to align the surface triangulation with a digital template of a hearing-aid shell, Block 216A. This digital template may be one of a plurality of possible templates retained in a library that is accessible and scannable by the CAD workstation in order to obtain a template having a highest degree of initial match to the originally generated surface triangulation. The template may comprise a model of a shell surface or a model of a shell having a uniform or nonuniform thickness. This alignment step may be performed automatically by software and/or interactively with the assistance of a design operator using the CAD workstation. The use of templates to assist in the generation of a three-dimensional model of a hearing-aid shell surface is optional. Alternatively, or in addition to the use of templates, one or more constraints may be applied to the surface triangulation to generate the model of the hearing-aid shell surface. For example, FIG. 3E illustrates the application of two constraints to the surface triangulation. These constraints may constitute slicing operations, as illustrated, or other detailing operations that may be defined by equations or in another manner in a text or other data file.

As illustrated by Block 216B of FIG. 3C, a shape of the surface triangulation may then be modified using a sequence of operations to more closely conform to a shape of the template or vice versa. These operations may include computing common areas and intersections between the template and the surface triangulation. Polygons outside the common areas may then be trimmed away to obtain a minimal shape. As illustrated by the right-hand side of FIG. 3D and Block 216C, this minimal shape may be used as a three-dimensional model of a hearing-aid shell surface that is preferably a 2-manifold with nonzero boundary. These modification operations may be automatically performed by the software and/or hardware running on the workstation, however, the design operator may also perform one or more of the modification operations in an interactive manner using conventional input devices (e.g., mouse, keyboard, etc.) and interface menus that are provided to a display. Alternatively, the model for the three-dimensional shell surface may be provided as an input file to the workstation operator. Such input file generation may be performed by another component, operator, audiologist or customer during an earlier stage in the manufacturing process.

Referring again to FIG. 3A, the three-dimensional model of a hearing-aid shell surface is then preferably nonuniformly thickened about a directed path P on a surface thereof. This directed path P may identify a desired location of an undersurface hearing-aid vent, Block 220. This thickening operation is preferably performed to define a thickened model of the shell surface as a watertight model that is free of self-intersections. As illustrated by Block 230, an operation is then performed to uniformly thicken the partially thickened model of the shell surface. In particular, the operations of Blocks 220 and 230 preferably include nonuniformly thickening the three-dimensional digital model of the hearing-aid shell surface about the directed path P to determine a partially offset inner shell surface and then uniformly thickening the digital model relative to the partially offset inner shell surface to determine an entirely offset inner shell surface. Alternatively, the preferred sequence of nonuniform and uniform thickening steps may be replaced by a different sequence, including a first nonuniformly thickening operation that results in a partially offset inner shell surface and a second nonuniformly thickening operation that results in an entirely offset inner shell surface. The nonuniformly thickening operation may be replaced by a strictly uniform thickening operation. Strictly uniform thickening operations may be appropriate in the event a hearing-aid vent is not necessary or is digitally attached and/or merged to an inner surface of an already thickened model.

Referring again to Block 220, the operations to nonuniformly thicken the digital model of the hearing-aid shell surface further include thickening the digital model using a bump function b(x) about a kernel K defined by a set of points on the directed path P, as described more fully hereinbelow. This bump function may be derived form a Gaussian distribution function or a spline function, however, other functions may also be used. An operation to determine a first offset of the directed path P' normal to the shell surface is then performed along with an operation to determine a respective normalized adjusted normal $n'_x$ for each of a plurality of vertices on the directed path P using parametrizations P,P': $[0,1] \rightarrow R^3$ proportional to a distance between the directed path P and the first offset of the directed path P'. Here, the operation to determine a respective normalized adjusted normal $n'_x$ preferably includes determining a respective normalized adjusted normal $n'_x$ for each of a plurality of first vertices on the digital model of the shell surface that are within a support of the bump function b(x). This is achieved by mixing an estimated normal at the respective first vertex $n_x$ with the normalized adjusted normal $n'_p$ at a nearest vertex on the directed path P. Preferred techniques for defining a directed path P may result in a directed path that is defined by at least one vertex that is not also a vertex of the digital model of the shell surface. Once a plurality of normalized adjusted normals have been determined, operations may be performed to locally thicken the digital model of the shell surface by moving a first vertex on the shell surface inward along a respective normalized adjusted normal extending from the first vertex $n'_x$. The distance the first vertex is moved is preferably defined by the bump function b(x). Global thickening operations may also be performed, preferably after the nonuniformly thickening operations and after the normals have been readjusted. As described more fully hereinbelow, these operations may include offsetting the inner surface of the shell model by the shell thickness s, by moving vertices on the inner surface along respective normalized re-adjusted normals.

Referring now to Blocks 240 and 250 of FIG. 3A, the thickening operations are preferably followed by operations to generate a digital model of a hearing-aid vent and then merge this model with the thickened model of the shell surface to form a resulting shell, preferably as a 2-manifold triangulation having a nonuniformly thick rim and a vent extending therethrough adjacent a thickest part of the rim. In particular, the operations to generate a digital model of a hearing-aid vent, Block 240, comprise an operation to determine an axis of the vent in the thickened model of the shell surface and determine a surface (e.g., tubular surface) of the vent about the axis. The axis is preferably defined as being offset from the directed path P adjacent a beginning point thereof (e.g., adjacent the rim of shell) and as meeting the directed path P at or adjacent its termination point. The resulting surface of the vent may comprise a triangulation that is a 2-manifold with nonzero boundary. Once the axis of the vent has been determined, a plurality of operations can then be performed to determine, for each of a plurality of points on the axis, a respective plane that is normal to the axis and passes through the respective point. Operations are then performed to determine, for each plane, a respective circle having a center on the axis. Moreover, in order to reduce interferences, operations may be performed to tilt a first plurality of the planes and to project each circle associated with the first plurality of tilted planes as an ellipse on the respective tilted plane. The surface of the vent may then be constructed by connecting together the ellipses on the first plurality of tilted planes with any remaining circles on the planes that extend normal to the axis of the vent. As described more fully hereinbelow with respect to FIG. 22, less complex operations may be used to define one or more receiver holes in the shell.

As illustrated by Block 250 and described more fully hereinbelow with respect to FIGS. 8-22, the digital model of the vent is then merged with the three-dimensional model of the hearing-aid shell. This operation may be performed by defining a top vent hole in the rim of the three-dimensional model of the hearing-aid shell and a bottom vent hole adjacent a termination point of the directed path. This operation of defining vent holes will convert the thickened model of the hearing-aid shell from a 2-manifold surface into a 2-manifold surface with nonzero boundary. Fully or partially automated operations may then be performed to merge the boundary (i.e., the vent holes) of the model of the hearing-aid shell with the boundary (i.e., ends) of the triangulated vent surface.

Referring now to Block 260, operations to modify the three-dimensional model of a hearing-aid shell may be performed so that what is typically a flat rim of the shell model is more suitable for receiving a supporting frame when printed. As will be understood by those familiar with conventional hearing-aid manufacturing methods, a supporting frame with a hatch cover hinged thereto is typically attached to a printed hearing-aid shell only after a faceplate has been glued to the printed shell and the faceplate (and shell) have been manually trimmed and smoothed. The faceplate also has an opening therein in which the supporting frame can be received and permanently or releasably connected.

The preferred operations illustrated by Block 260 include partially or completely automated CAD operations to either digitally modify the shape of the hearing-aid shell to be matingly compatible with a supporting frame when printed, or to digitally merge a generic faceplate model to the rim of the shell and then digitally trim away excess portions and smooth abrupt edges. In particular, these operations may enable a CAD tool operator to visually align a supporting frame to a rim of a displayed digital model of the hearing-aid shell and then mark or identify vertices and/or edges on the frame and shell model to be modified. Operations can then be performed automatically by the CAD tool to fill in the shape of the shell model so that the final shape of the rim is matingly compatible with the supporting frame. Alternatively, the operations of Block 260 may include attaching a digital faceplate model to the rim of the shell model either automatically or after alignment by the CAD tool operator. Automated or interactive digital trimming and smoothing operations are then typically performed to generate a final hearing-aid shell model that can be printed, Block 300. The printing operation may be performed using a stereolithography apparatus (SLA) or stereolithographic sintering tool (SLS) that is communicatively coupled and responsive to commands issued by the CAD tool. In this manner, the manual and time consuming operations illustrated by Blocks 22 and 24 of FIG. 1 can be avoided. The printing operations may also be performed using a conventional three-dimensional printer that operates as a rapid-prototyping tool. These tools and apparatus are described herein and in the claims as three-dimensional printers.

Figure 4A:
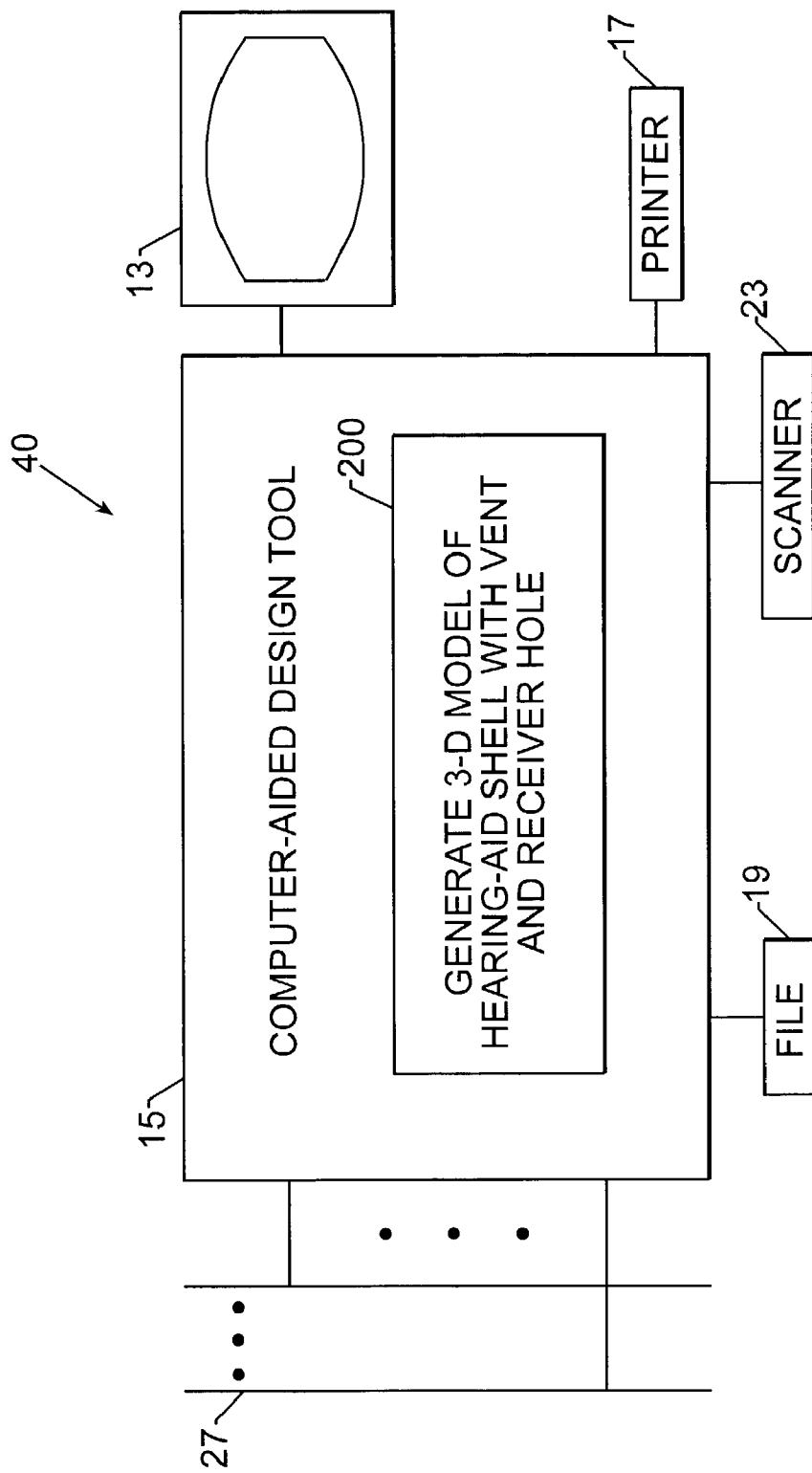
FIG. 4A is a first general hardware description of a computer workstation comprising software and hardware for manufacturing hearing-aid shells in accordance with embodiments of the present invention.

Referring now to FIG. 4A, a general hardware description of a custom CAD/CAM workstation 40 is illustrated as comprising, among other things, software and hardware components that perform operations including but not limited to processing point cloud data into triangulated surfaces and generating three-dimensional models of hearing-aid shells in accordance with the preferred operations described herein. The workstation 40 preferably includes a computer-aided design tool 15 that may accept a point cloud data representation of an ear canal of a subject via a file 19, a scanner 23 or data bus 27. A display 13 and a three-dimensional printer 17 are also preferably provided to assist in performing the operations of the present invention. The hardware design of the above described components 13, 17, 19, 27 and 23 is well known to those having skill in the art and need not be described further herein.

This workstation 40, which may be used as part of an automated hearing-aid shell manufacturing system, preferably comprises a computer-readable storage medium having computer-readable program code embodied in the medium. This computer-readable program code is readable by one or more processors within the workstation 40 and tangibly embodies a program of instructions executable by the processor to perform the operations described herein and illustrated by the accompanying figures, including FIGS. 3A-3D and 7-22.

Among other things, the computer-readable program includes code that generates a first digital model of a hearing-aid shell (e.g., completely-in-canal (CIC) model) from point cloud data and also performs calculations of the interior volume of the first digital model to determine whether preselected hearing-aid components can fit properly within the interior volume of the first digital model. In the event a proper fit is not detected, the code can also generate a second digital model of a hearing-aid shell that is larger than the first digital model and calculates an interior volume thereof. This second digital model may also be generated from the point cloud data and may constitute a somewhat larger in-the-ear (ITE) model. The code then determines whether the preselected hearing-aid components can fit properly within an interior volume of the second digital model of the hearing-aid shell. If necessary, these operations may be repeated for gradually larger models until a fit is detected. Accordingly, the workstation 40 can perform operations to determine in advance of printing whether a particular model of a hearing-aid shell (e.g., nonuniformly thickened model with vent) will be large enough to support the selected components. The size specifications associated with these internal hearing-aid components may be loaded into the workstation 40 from an internet site or electronic file, for example.

In the foregoing sections, a thorough and complete description of preferred embodiments of the present invention have been provided which would enable one of ordinary skill in the art to make and use the same. Although unnecessary, a detailed mathematical treatment of the above-described operations will now be provided.

Construct Bump Functions

In this section, a generic bump function is constructed from the Gaussian normal distribution function used in probability theory. The bump function can be used to control local thickening as well as local averaging of normal vectors.

Ur bump function. The Gaussian normal distribution with expectation $\mu=0$ and standard deviation $\sigma$ is given by the function $$f(t) = \frac{1}{\sigma\sqrt{2\pi}} \cdot e^{-\frac{t^2}{2\sigma^2}}.$$

About 68% of all values drawn from the distribution lie between $-\sigma$ and $\sigma$ and more than 99% lie between $-3\sigma$ and $3\sigma$. We define the ur bump function $$g(t)=\max\{C_1 \cdot e^{-C_2 t^2} - C_3, 0\}$$

by choosing $C_1$, $C_2$, $C_3$ such that
 assuming $C_1=1/\sigma\sqrt{2\pi}$ and $C_3=0$, as for f, the standard deviation is $\sigma=1$,
 $g(0)=1$, and
 $g(t)=0$ for $|t|\geq 3$.

Figure 8:
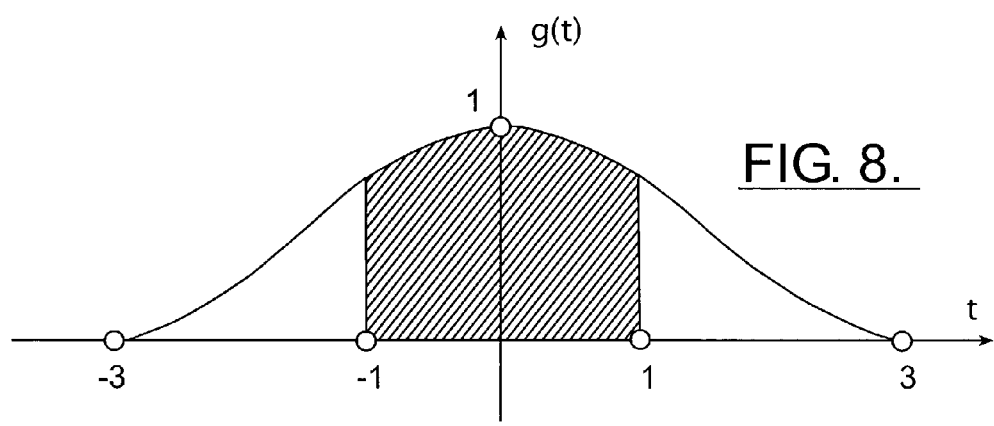
FIG. 8 illustrates the shape of a ur bump function g(t) derived from the Gaussian normal distribution f(t).

The resulting function is illustrated in FIG. 8. The three requirements are satisfied by setting $$C_1 = \frac{1}{1-e^{-4.5}} = 1.0112\ldots,$$

$$C_2 = \frac{1}{2},$$

$$C_3 = e^{-4.5} \cdot C_1 = 0.0112\ldots$$

Figure 9:
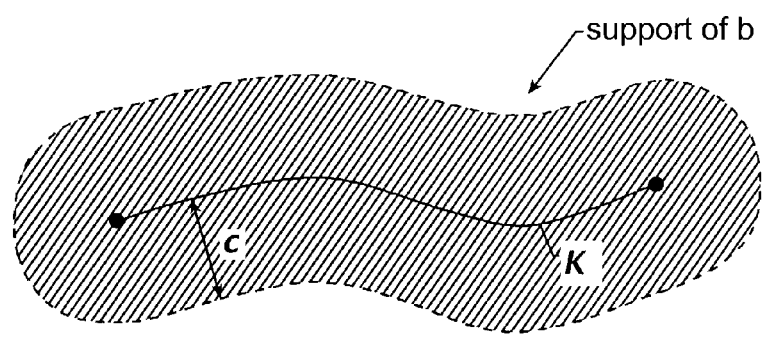
FIG. 9 illustrates a support of a bump function b(x) with kernel K and width c.

Two-dimensional bumps. In a preferred application, a bump function is constructed around a kernel K, which can be a single point or a set of points. The bump function reaches its maximum at all points in the kernel and decreases with the distance from the kernel, $$b(x)=a \cdot g(3d_K(x)/c),$$

where $d_K(x)$ is the minimum distance from x to a point of K. We call a the amplitude and c the width of b. The support is the set of points x with non-zero $b(x)$. FIG. 9 illustrates the definitions by showing the support of a bump function whose kernel is a curve in $R^2$. For example, a bump function may be used to slowly change the estimated unit normal vector at x to that at the nearest point $p \in K$. In this case we would set $a=1$ and define $$n'_x=(1-b(x)) \cdot n_x + b(x) \cdot n_p,$$

where $n_x$ and $n_p$ are the old unit normals at x and p.

Figure 10:
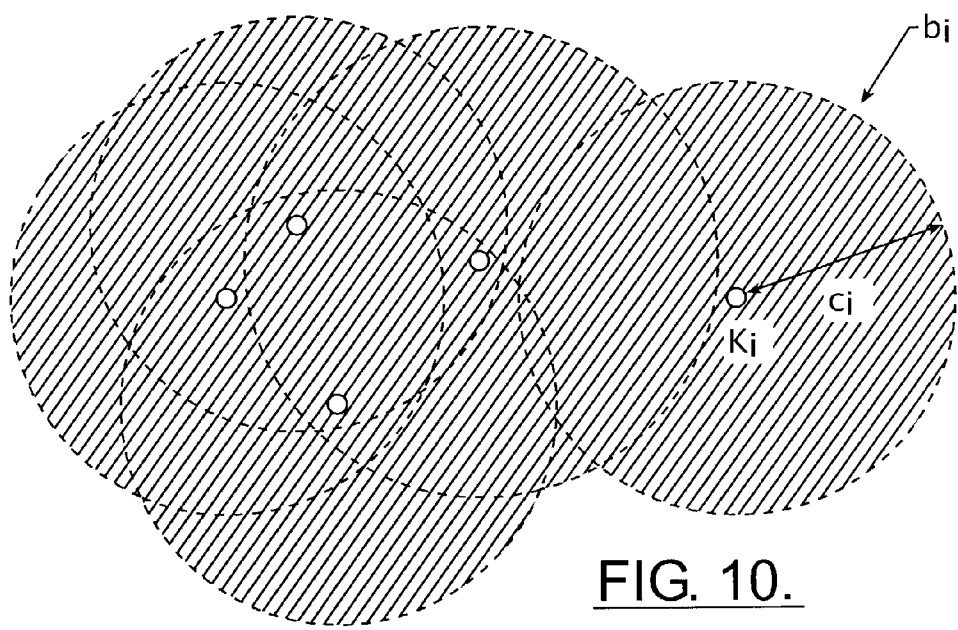
FIG. 10 illustrates a collection of bump functions with overlapping supports.

Overlay of bumps. Suppose we have a number of bump functions $b_i$, each with its own kernel $K_i$, amplitude $a_i$, and width $c_i$, as shown in FIG. 10. We construct a total bump function b that smoothes out the transitions between the $b_i$, and whose support is the union of supports of the $b_i$, $$b(x) = \frac{\sum b_i(x)}{\sum b_i(x)/a_i} \cdot \left(1 - \prod\left(1 - \frac{b_i(x)}{a_i}\right)\right),$$

where the two sums and the product range over all indices i. The first term in the expression is the weighted average of the amplitudes, and the second blends between the various bumps involved. If all amplitudes are the same, then the weighted average is again the same and b(x) majorizes all $b_i(x)$, that is, $b(x) \geq b_i(x)$ for all x and all i.

Perform Non-uniform Thickening

The 2-manifold with boundary, M, is preferably thickened in two steps. First, a neighborhood of a path sketching the location of the vent is thickened towards the inside. Second, the entire model is thickened uniformly towards the inside. Both steps can be performed to leave the outer boundary of the shell unchanged. We begin by sketching the underground location of the vent as a directed path on the 2-manifold with boundary.

Figure 11:
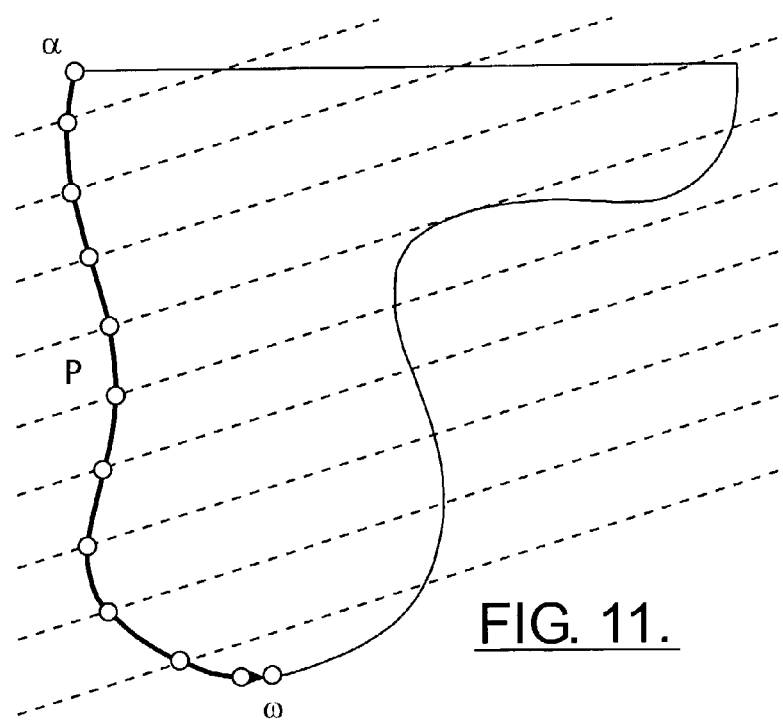
FIG. 11 illustrates the directed path P that sketches the location of the underground vent. The beginning and termination points of the directed path are illustrated as $\alpha$ and $\omega$, respectively.

Sketching the vent. The vent will be constructed as a tube of radius $r>0$ around its axis. We sketch the location of the axis by drawing a path P directed from its initial point $\alpha \in Bd$ M to its terminal point $\omega \in M-Bd$ M. Both points are specified by the software user, and the path is automatically constructed as part of a silhouette. Let $T_\alpha$ and $T_\omega$ be the tangent planes at $\alpha$ and $\omega$, and let $L=T_\alpha \cap T_\omega$ be their common line. The view of M in the direction of L has both $\alpha$ and $\omega$ on the silhouette. We compute P as the part of the silhouette that leads from $\alpha$ to $\omega$, as shown in FIG. 11.

There are a few caveats to the construction of P that deserve to be mentioned. First, the silhouette itself is not necessarily a connected curve. Even small errors in the approximation of a smooth surface will cause the silhouette to consist of possibly many mutually disjoint curves, and such errors are inevitable in any piecewise linear approximation. Second, even if the silhouette were connected, it might wind back and forth if viewed from a normal direction. We solve both difficulties by sampling the silhouette and then constructing a spline curve that approximates but does not necessarily interpolate the sampled point sequence. For the sampling we use some constant number of parallel planes between $\alpha$ and $\omega$, as shown in FIG. 11. The spline curve is constructed with an emphasis on straightness, even that means sacrificing the accuracy of the approximation. Finally, we project the spline curve onto M. A conventional technique for doing the projection can be found in V. Krishnamurthy and M. Levoy, Fitting smooth surfaces to dense polygonal meshes, *Computer Graphics*, Proc. SIG-GRAPH 1996, 313-324.

Thickening process. The path P is used in the first thickening step that creates the volume necessary to rout the vent through the hearing-aid shell. A second thickening step is then preferred that uniformly affects the entire model. The biggest challenge in thickening is to avoid or repair surface self-intersections. We decompose the thickening process into five steps, three of which are concerned with avoiding or removing self-intersections.

1.1 Adjust normal vectors near the path P.
1.2 Thicken M in a neighborhood of P.
1.3 Re-adjust all normal vectors.
1.4 Thicken the model uniformly everywhere.
1.5 Repair surface self-intersections.

Figure 12:
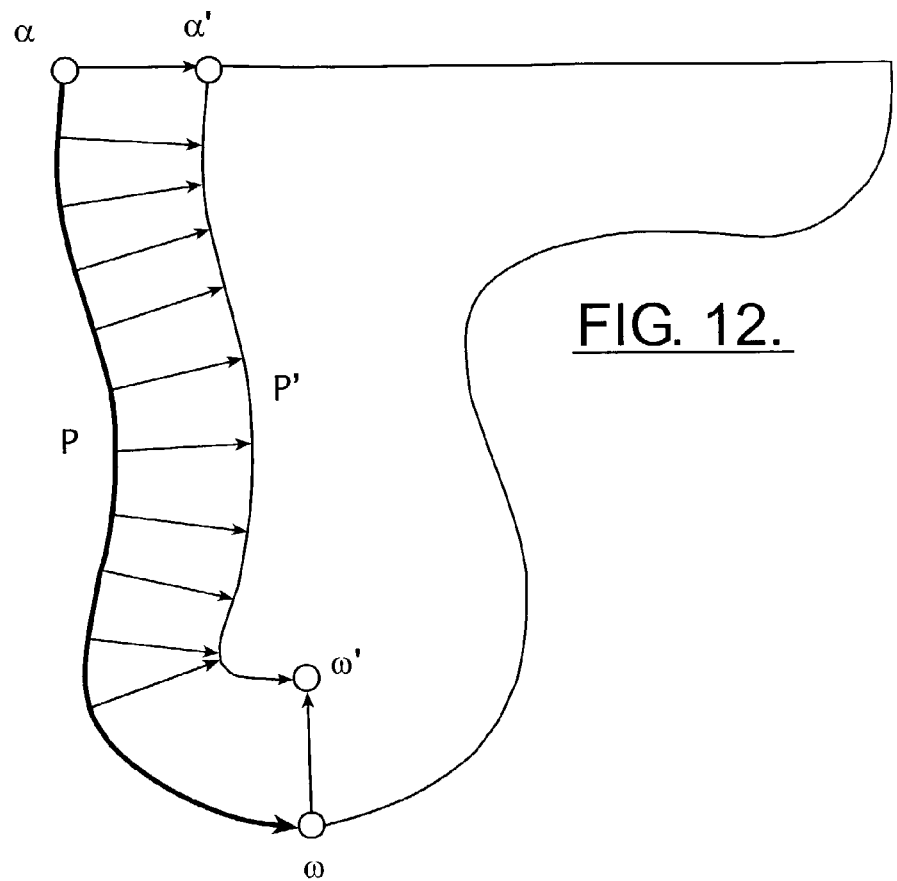
FIG. 12 illustrates offsetting the directed path P as an operation in creating the volume necessary to route the vent illustrated by FIG. 5.

Step 1.1: Adjust normals. To prepare for Step 1.2, we offset P normal to M towards the inside of the model. This is done by moving each vertex of P a distance $2r+2w-s$ along its estimated normal, where $0<w\leq s$ are the user-specified wall and shell thicknesses. As illustrated in FIG. 12, the resulting path P' leads from the image $\alpha'$ of $\alpha$ to the image $\omega'$ of $\omega$. Offset operations frequently create self-intersections, which typically occur at places where the curvature is greater than or equal to one over the offset distance. For the special case of hearing-aid shells, we may assume that such high curvature occurs only near the terminal point ω of P. We thus drop the images of the last few vertices before ω along P and replace the piecewise linear path by a spline approximation P'. Computing spline curves approximating a sequence of points is a well established subject with standard methods described in textbooks in the area of geometric design.

We use parametrizations P, P': [0,1]→R³ proportional to path-length in adjusting normal vectors. For a vertex p=P(λ) we call $$n'_p = \frac{P'(\lambda) - P(\lambda)}{2r + 2w - s}$$

the normalized adjusted normal at p. We use this name even though $n'_p$ has only approximately unit length and is only approximately normal to M.

For a vertex x∈M we compute $n'_x$ by mixing the estimated normal at x with the normalized adjusted normal at the nearest point p∈P. The estimated normal at x is $n_x = 1 \cdot (\Sigma \psi_i \cdot n_i)$, where the sum ranges over all triangles in the star of x, $\psi_i$ is the i-th angle around x, and $n_i$ is the inward normal of the i-th triangle. The length of $n_x$ is chosen such that moving x to $x+n_x$ produces an offset of roughly unit thickness along the neighboring triangles. This is achieved by setting $$l = \frac{\sum \frac{\psi_i}{\cos \phi_i}}{(\sum \psi_i) \cdot \|\sum \psi_i \cdot n_i\|},$$

where $\phi_i$ is the angle between $n_x$ and the plane of the i-th triangle. To mix $n_x$ with $n'_p$ we use the bump function b with kernel P, amplitude a=1, and width c=3r. In other words, we let t=∥x−p∥/r and define the normalized adjusted normal at x as $$n'_x = (1-g(t)) \cdot n_x + g(t) \cdot n'_p.$$

Recall that g(t)=0 if |t|≧3. This implies that $n'_x = n_x$ if ∥x−p∥≧3r.

Figure 13:
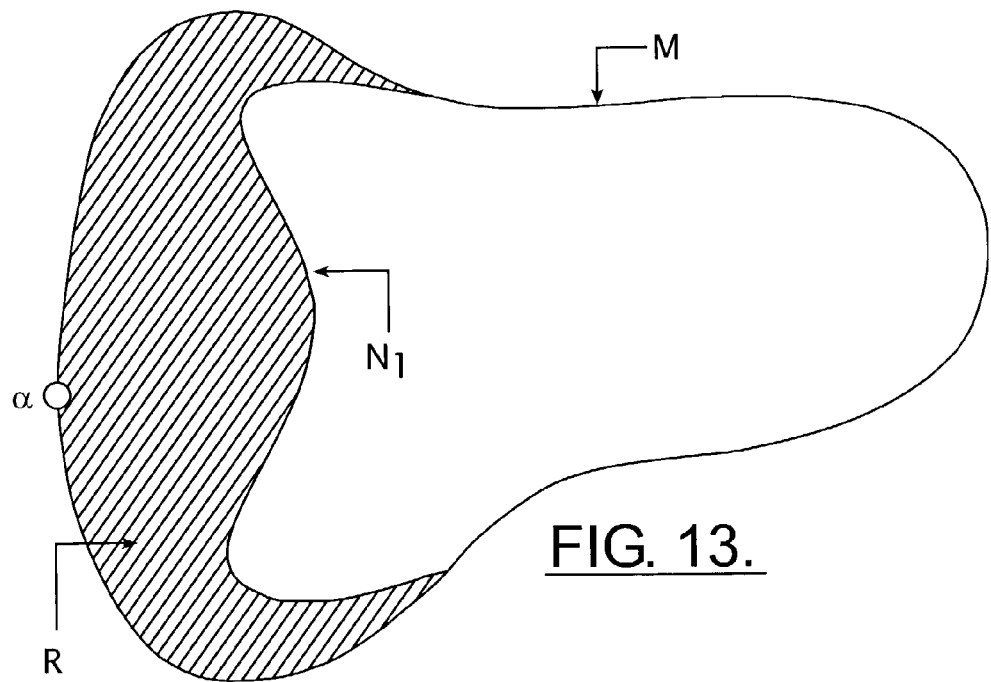
FIG. 13 is a top view of a shell after an initial nonuniformly thickening operation. The rim has a partially positive width (shaded) and a zero width.

Step 1.2: Thicken M around P. The first thickening step used the bump function b with kernel P, amplitude a=2r+2w−s, and width c=3r. It has the same support as the bump function for adjusting normals but possibly different amplitude. We thus thicken by moving x along $b(x) \cdot n'_x$, where b(x)=a·g(t) with t=∥x−p∥/r, as before. The result is a bump in the neighborhood of distance up to 3r from P. At distance 3r or more, we do thickening only topologically. This means we create a copy of M there also, but with zero offset from M. Similarly, we construct a partially zero width rim, as shown in FIG. 13. After the thickening step we have the original M (the outer surface), a partially offset copy $N_1$ of M (the inner surface), and a rim R connecting M and $N_1$ along their respective boundaries.

Step 1.3: Re-adjust normals. We change the normal vectors again, this time to prepare for the global thickening operation in Step 1.4. The goal is to eliminate normal fluctuations due to local features of roughly size s, which is the amount of thickening done in Step 1.4. First we detect such features by taking cross-sections of $N_1$ in three pairwise orthogonal directions. For each directions we take a sequence of parallel planes at distance s apart, and we intersect each plane with $N_1$. The result is a polygon in that plane, and we sample points $p_j$ at arc-length distance s along the polygon. For each $p_j$ we let $n_j$ be the normal vector of the polygon at $p_j$. We mark $p_j$ if (i) the angle between $n_j$ and $n_{j+1}$ exceeds a constant θ>0, or (ii) the angle between $n_j$ and $p_{j+1}-p_j$ differs from the right angle by more than θ.

Figure 14:
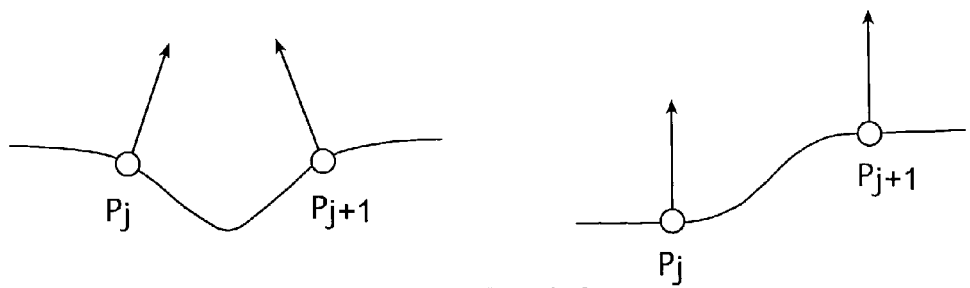
FIG. 14 illustrates surface features of roughly size s.

The two criteria detect small features of the type shown in FIG. 14. We experimentally determined that θ=10° is an appropriate angle threshold for the detection of small features. We note that criterion (i) distinguishes between positive and negative angles and causes $p_j$ to be marked only if the angle from $n_j$ to $n_{j+1}$ is positive. For each marked point $p_j$ we average the estimated normals at $p_{j-1}$, $p_j$, $p_{j+1}$ in $N_1$, and we scale the length of the resulting average normal depending on the local neighborhood of $p_j$, in the same way as in the above definition of the estimated normal.

Finally, we use a bump function $b_j$ for each marked point $p_j$ to locally re-adjust normal vectors. The amplitude of $b_j$ is $a_j=1$ and the width is $c_j=3s$. Let b be the total bump function majorizing the $b_j$. The normalized re-adjusted normal of x is then $$n''_x = (1 - b(x)) \cdot n'_x + b(x) \cdot \frac{\sum b_j(x) \cdot n_j}{\sum b_j(x)}.$$

Figure 15:
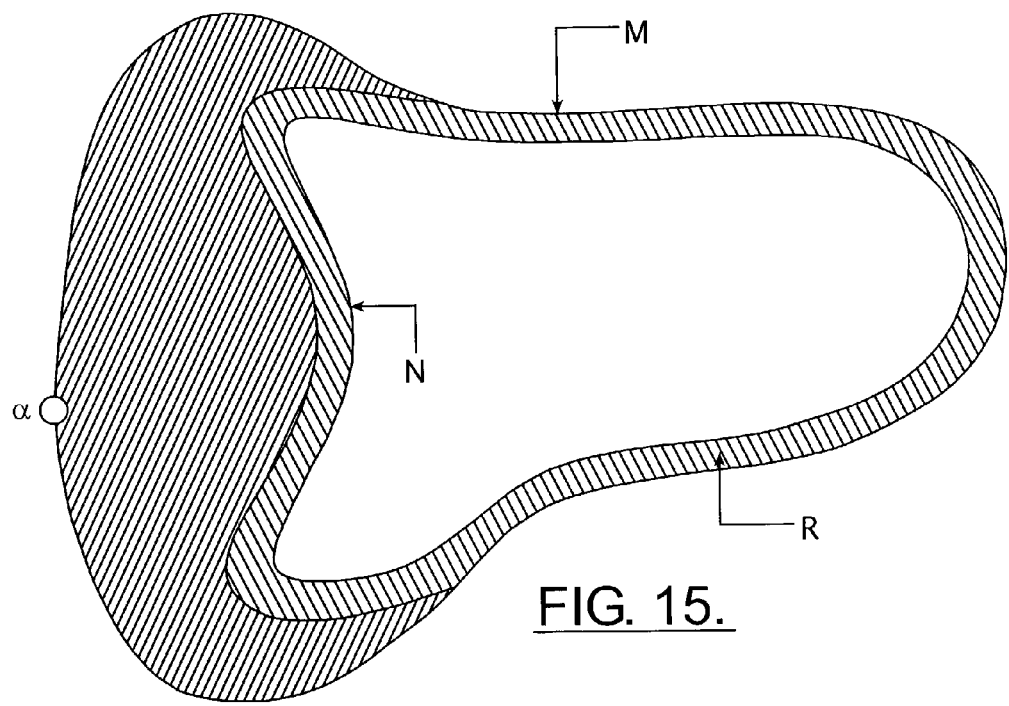
FIG. 15 is a top view of a shell after a final uniform thickening operation. The rim is the entire shaded region.
Figure 16:
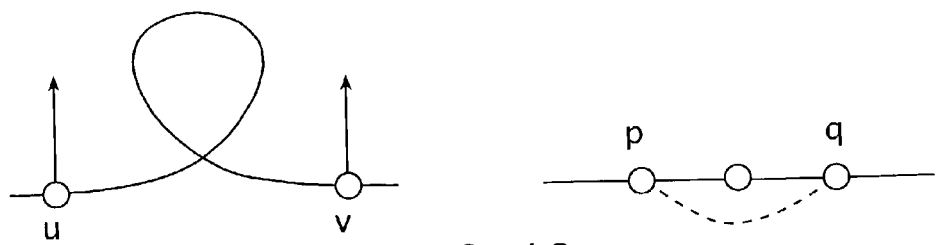
FIG. 16 illustrates a self-intersection (left) and a short-cut (right).

Step 1.4: Thicken globally. The second thickening step offsets $N_1$ by the shell thickness s uniformly everywhere. The result is a new inner surface N and a new rim R with positive width all around, as illustrated in FIG. 15. The shell can now be defined as the volume bounded by S=M∪N∪R.

Step 1.5: Repair surface self-intersections. In the last step we use relaxation to smooth the new inner surface, and at the same time to repair self-intersections, if any. We first relax the boundary of the inner surface, Bd N, which is a closed curve. Troubles arise either when the curve has self-intersections, as in FIG. 16 to the left, or when there are short-cuts in the form of edges in N that connect two non-contiguous vertices along Bd N, as in FIG. 16 to the right. We clean up a self-intersection by determining a vertex u before and a vertex v after the self-intersection such that u and v have roughly parallel normal vectors. We then unwind the path from u to v by rerouting it along the straight line segments connecting u and v. A problematic short-cup between vertices p and q is remedied by flipping the edge pq, or if that is not possibly, by subdividing pq at its midpoint.

Figure 17:
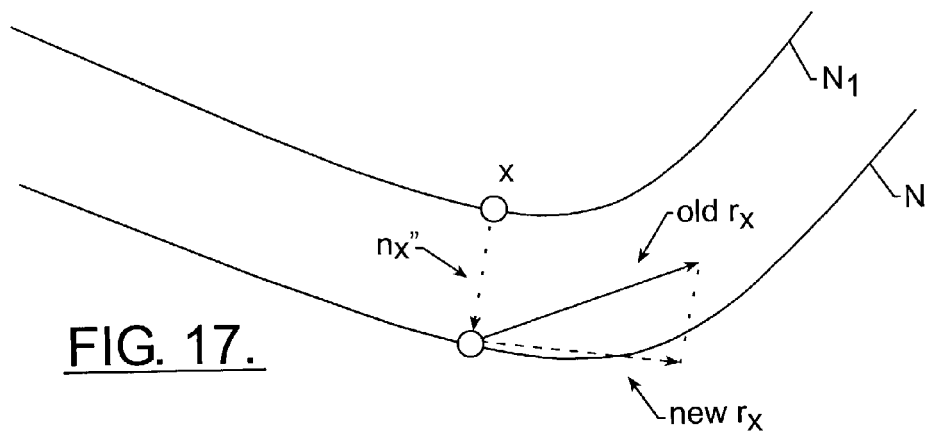
FIG. 17 illustrates a dotted normal vector, a solid relaxation vector and a dashed adjusted relaxation vector.

We second relax the rest of the inner surface N, while keeping Bd N fixed. The relaxation moves each vertex x along its relaxation vector $r_x$ computed from the neighbor vertices of x in N. A conventional relaxation operator is described in an article by G. Taubin, A signal processing approach to fair surface design, *Comput. Graphics*, Proc. SIGGRAPH 1995, 351-358. The motion defined by $r_x$ usually keeps x close to the surface, but in rare cases, $r_x$ can have a significant normal component, as shown in FIG. 17. To determine when this is the case, we compute the projection of $r_x$ onto the vector $n''_x$ used in Step 1.4. If $r_x$ counteracts the thickening operation to the extent that the gained thickness is less than w≦s, then we adjust $r_x$ as shown in FIG. 17. Formally, the relaxation vector is adjusted as follows.

if $\epsilon = -(s-w) - s \cdot (n''_x, r_x) > 0$ then $r_x = r_x + \epsilon/s \cdot n''_x$ endif.

The relaxation is then performed using the adjusted vectors.

Creation of Vent in Thickened Model

The thickening operation creates the volume through which we can rout the vent. The basic idea for routing includes: first, offset P to construct the axis and, second, sweep a circle of radius r normally along the axis to construct the vent. The execution of these steps can be complex and frequently requires design iterations.

Figure 18:
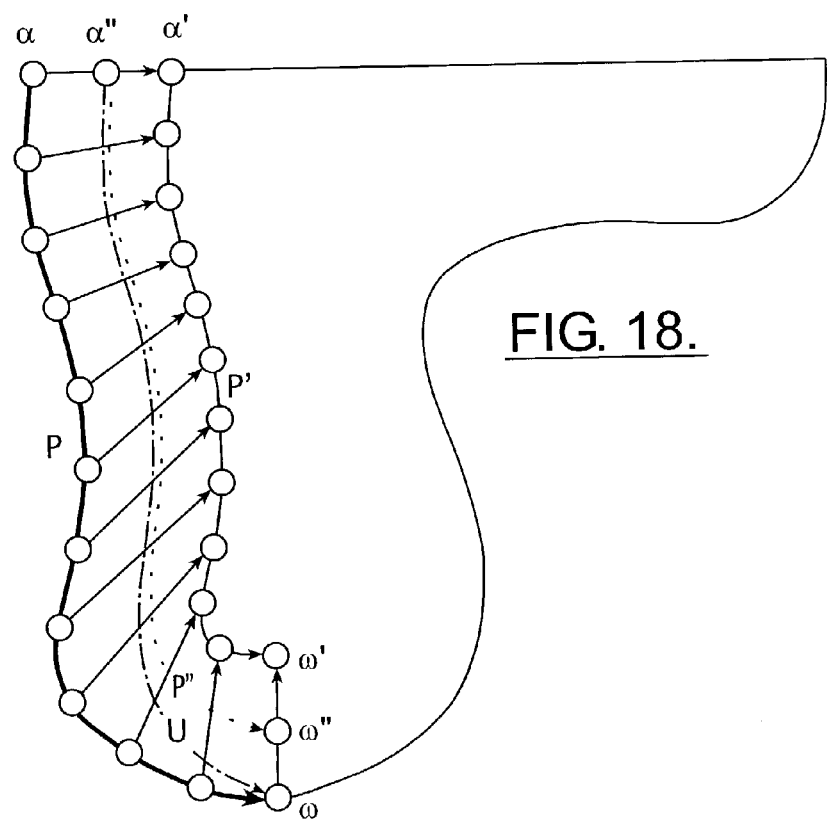
FIG. 18 illustrates a dotted offset path P''' and axis U of the vent.

Vent axis. For the most part, the axis U lies at a fixed distance ratio between P and P'. We therefore start the construction by defining $$P''(\lambda) = \frac{(r+w-s) \cdot P(\lambda) + (r+w) \cdot P'(\lambda)}{2r+2w-s},$$

for all $0 \leq \lambda \leq 1$. This approximation of the axis is acceptable except near the end where P'''(1) does not reach the required terminal point, ω. We thus construct the axis by sampling P''' for $0 \leq \lambda \leq \frac{3}{4}$, append ω to the sequence, and construct U as a spline curve that approximates the point sequence and goes from α''=P'''(0) to ω. The result of this operation is illustrated in FIG. 18.

Tube construction. The vent is constructed by subtracting the tube of radius r around U from the volume created by thickening. The algorithm iteratively improves the initial design by moving and adjusting the vertices that define the axis and the boundary of the tube. The algorithm proceeds in six steps.

2.1 Construct normal circles $C_i$.
2.2 Construct initial and terminal curves.
2.3 Adjust planes and project $C_i$ to ellipses $E_i$.
2.4 Repair intersections between $E_i$ and S.
2.5 Connect ellipses to form tube boundary.
2.6 Connect tube and shell boundaries.

Step 2.1: Normal circles. Assume a parametrization U: $[0,1] \to R^3$ proportional to path-length, similar to those of P and P'. We sample k+1 points from U by selecting $$u_i = U\left(\frac{i}{k}\right)$$

for all $0 \leq i \leq k$, where k is described below. Write $z_i$ for the unit tangent vector at point $$u_i = U\left(\frac{i}{k}\right).$$

For each point $u_i$, we let $G_i$ be the plane passing through $u_i$ normal to $z_i$, and we construct the circle $C_i$ of radius r around $u_i$ in $G_i$.

Constructing $C_i$ means selecting some constant number l of points equally spaced along the circle, and connecting these points by edges to form a closed polygon. We use an orthonormal coordinate frame $x_i$, $y_i$ in $G_i$ and choose the first point on $C_i$ in the direction $x_i$ from $u_i$. Step 2.5 will connect the polygonal approximations of the cross-sections into a triangulated surface. To facilitate this operation, we choose the coordinate frames in a consistent manner as follows. Choose $x_0$ as the normalized projection onto $G_0$ of the estimated normal $n_\alpha$ of $\alpha \in M$. The other vectors $x_i$ are obtained by propagation:

for i=1 to k do $x_i = x_{i-1} - (x_{i-1}, z_i) \cdot z_i; x_i = x_i/\|x_i\|$ endfor.

Experiments indicate that l=20 is an appropriate choice for the number of points around a cross-section. The resulting edge-length is then just slightly less than $$\frac{2\pi r}{l} = 0.31 \ldots \cdot r.$$

We choose k such that the distance between two adjacent cross-sections is about twice this length: $k = \rceil |U|/4\pi r \lceil$, where |U| is the length of U. The distance between two adjacent planes is then roughly $$\frac{|U|}{r} \approx \frac{4\pi r}{l} = 0.62 \ldots \cdot r.$$

Step 2.2: Limiting curves. The initial and terminal curves are the intersections between the tube boundary and the shell boundary around the initial point α'' and the terminal point ω. We construct the initial curve from $C_0$ and the terminal curve from $C_k$. The latter construction is described first.

Figure 19:
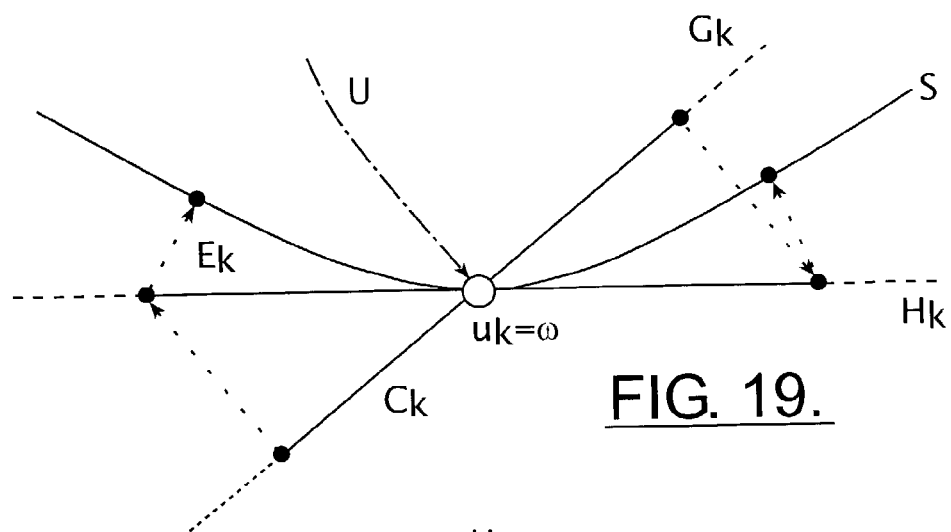
FIG. 19 illustrates a sketch of the terminal curve construction.

Let $H_k = T_\omega$ be the plane tangent to M at point ω. We project $C_k$ parallel to $z_k$ onto $H_k$, as shown in FIG. 19. The result is the ellipse $E_k$ in $H_k$. Finally, we project $E_k$ normally onto M. By design, the neighborhood of ω in S is fairly flat so that $E_k$ is fairly close to the terminal curve, much closer than suggested by FIG. 19.

The algorithm for the initial curve is similar, leading to the construction of a plane $H_0$, an ellipse $E_0$ in $H_0$, and the initial curve by normal projection of $E_0$ onto S. By construction, the neighborhood of α'' in S is contained in the tangent plane, and thus the normal projection just transfers the points of $E_0$ to the representation within S, without changing their positions in space.

Step 2.3: Planes. The circles $C_i$ may interfere with the initial or terminal curves and they may interfere with each other. Such interferences cause trouble in the construction of the vent surface and are avoided by tilting the planes defining the cross-sections. In other words, we construct a new sequence of planes $H_i$ passing through the $u_i$ in an effort to get (i) almost parallel adjacent planes, and
(ii) planes almost normal to the axis.

Objective (i) overwrites (ii). The boundary conditions are defined by the fixed tangent planes $H_0$ and $H_k$, which cannot be changed. The sequence of planes is constructed in two scans over the initial sequence defined by $H_0$,

```
H_i = G_i for 1 ≤ i ≤ k - 1, and H_k.
    for i = k - 1 downto 1 do
        if DOESINTERFERE(E_i', H_{i+1}) then
            TILT(H_i, e_{i+1})
        endif
    endfor;
    for i = 1 to k - 1 do
        if DOESINTERFERE(E_i', H_{i-1}) then
            TILT(H_i, e_{i-1})
        endif
    endfor.
```

Here, $E'_i$ is defined similar to $E_i$, except that it is obtained by projecting the somewhat larger circle $C'_i \subseteq G_i$ with center $u_i$ and radius r+w. This larger ellipse includes the necessary buffer around the tube and is therefore more appropriate than $E_i$ in interference and intersection tests. The boolean function DOESINTERFERE returns true if $E'_i$ has non-empty intersection with the adjacent plane, which is $H_{i+1}$ in the first scan and $H_{i-1}$ in the second scan. Note that the interference test is not symmetric, which is one of the reasons we perform two scans, one running up and the other down the sequence. Another reason is that most of the adjustments are done near the initial and terminal planes, whose normal vectors $e_0$ and $e_k$ can be expected to be significantly different from the corresponding tangent vectors $z_0$ and $z_k$ of U.

Figure 20:
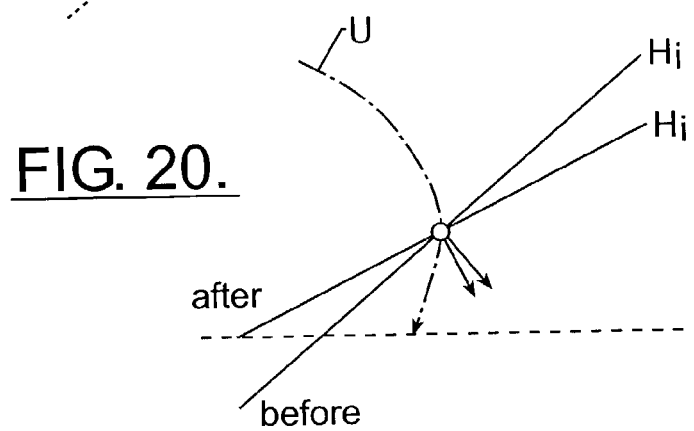
FIG. 20 illustrates an ellipse $E'_i$ before and after tilting the plane $H_i$.

If there is an interference, function TILT adjusts the plane $H_i$ by rotating $e_i$ towards the normal vector of the adjacent plane, which is either $e_{i+1}$ or $e_{i-1}$. The operation is illustrated in FIG. 20.

Step 2.4: Intersections. It is quite possible that the ellipses constructed in Step 2.3 intersect the shell boundary, S. If this happens, we move their centers $u_i$ and thus modify the axis of the vent. If moving the $u_i$ is not sufficient to eliminate all intersections, we thicken the shell by moving the inner surface further inwards. We write the algorithm as three nested loops.

```
for #_1 times do
    for #_2 times do
        for i = 1 to k - 1 do
            if E_i' ∩ S ≠ ∅ then adjust u_i endif
        endfor;
        if no adjustment done then exit endif;
        relax U
    endfor;
    if intersections remain then
        thicken S towards inside
    endif
endfor.
```

We experimentally determined $\#_1=3$ and $\#_2=10$ as appropriate number of times to repeat the two loops. In most of the cases we thicken S once, and reach an acceptable design after the second iteration.

When we test whether or not $E'_i \cap S =$, we compute the cross-section of S along $H_i$, which is a polygon $S_i$. It is convenient to transform the ellipse back to the circle $C'_i$. The same transformation maps $S_i$ to a new polygon $S'_i$. We have an intersection iff $S'_i$ contains a point whose distance from as is less than the radius of $C'_i$, which is r+w. This point can either be a vertex of $S'_i$ or lie on an edge of $S'_i$. We compute the point $x_i \in S'_i$ closest to $u_i$, and we report an intersection if $\|x_i - u_i\| < r+w$. In case of an intersection, we move $u_i$ away from $x_i$:

$$u_i = u_i + (r + w - \|u_i - x_i\|) \cdot \frac{u_i - x_i}{\|u_i - x_i\|}.$$

The new point $u_i$ is then projected back to the plane $G_i$, in order to prevent that the movement of sampled points is unduly influenced by the direction of the planes $H_i$. After moving the points $u_i$ we relax the axis they define in order to prevent the introduction of high curvature pieces along U. Then the loop is repeated. We experimentally determined that $\#_2=10$ iterations of the loop suffice, and if they do not suffice then the situation is so tight that even further iterations are unlikely to find a solution. We then thicken the shell towards the inside and repeat the outermost loop.

Next we describe how the thickening of the shell is accomplished. We represent each non-empty intersection $E'_i \cap N$ by a bump function $b_i$ whose kernel is a point $p_i \in N$. The amplitude measures the amount of thickening necessary to eliminate the intersection. We use roughly elliptic supports with vertical width 4s and horizontal width a little larger than necessary to cover the intersection. The general situation, where there are several and possibly overlapping supports, is illustrated in FIG. 10. Let b(x) be the total bump function as defined above. We thicken by moving x a distance controlled by the total bump function along its normalized re-adjusted normal, $b(x) \cdot n''_x$.

Figure 21:
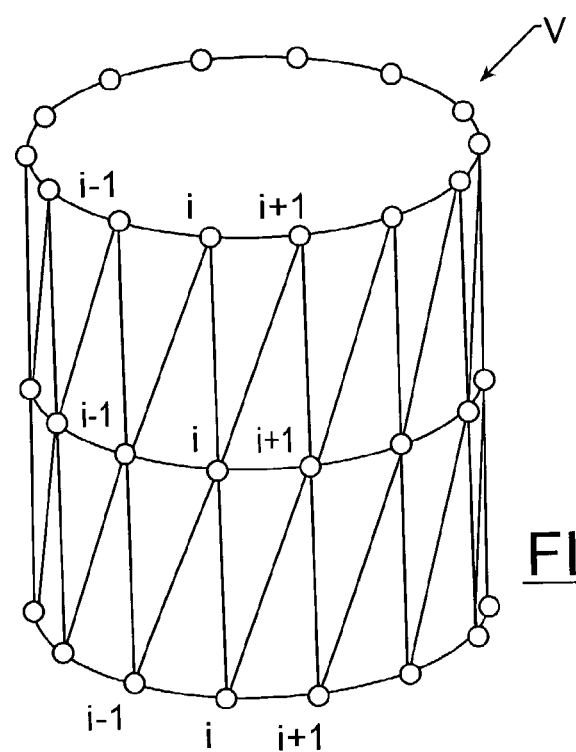
FIG. 21 illustrates a portion of a triangulation of a vent surface.

Step 2.5: Vent surface. Recall that the points defining the ellipses are given in angular orders, and the respective first points are roughly aligned. The points and edges of the ellipses can therefore be connected in straightforward cyclic scans around the cross-sections. The result is a triangulation V representing the boundary of the tube or vent, as illustrated in FIG. 21.

Step 2.6: Connection. To connect the boundary V of the vent with the boundary surface S of the shell, we subdivide S along the initial and terminal curves of V. The two curves bound two disks, which we remove from S. Then S and V are joined at shared curves. The subdivision is likely to create some small or badly shaped triangles, which can be removed by edge contractions triggered by a local application of a surface simplification algorithm.

Construction of Receiver Hole

Figure 22:
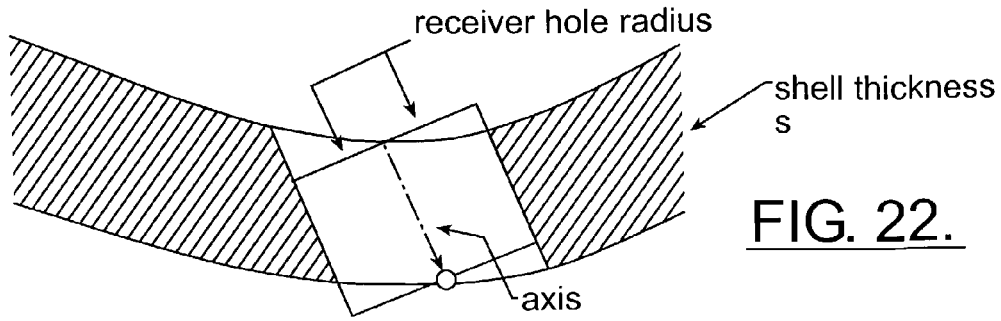
FIG. 22 illustrates a receiver hole specified by axis and radius.

The receiver hole is a short tunnel that passes through the volume of the shell right next to the end of the vent, as shown in FIG. 5. Similar to the vent, we construct the hole by removing a circular tube defined by its axis and radius. Because the hole is short, we can restrict ourselves to cylindrical tubes, which are completely specified by the line axis and the radius, as shown in FIG. 22. The cylindrical tube is specified by the software user, who selects the radius and defines the axis by giving its terminal point and direction.

The construction of the receiver hole may borrow a few steps of the vent creation algorithm described above. First, the initial and terminal curves of the receiver hole are constructed from a circle normal to the axis, as explained in Steps 2.1 and 2.2. Second, the hole boundary is obtained by connecting the two curves, as explained in Step 2.5. Third, the hole boundary is connected to the shell boundary by subdividing S along the two curves, removing the two disks, and joining the two surfaces along their shared curves, as explained in Step 2.6.

Figure 23:
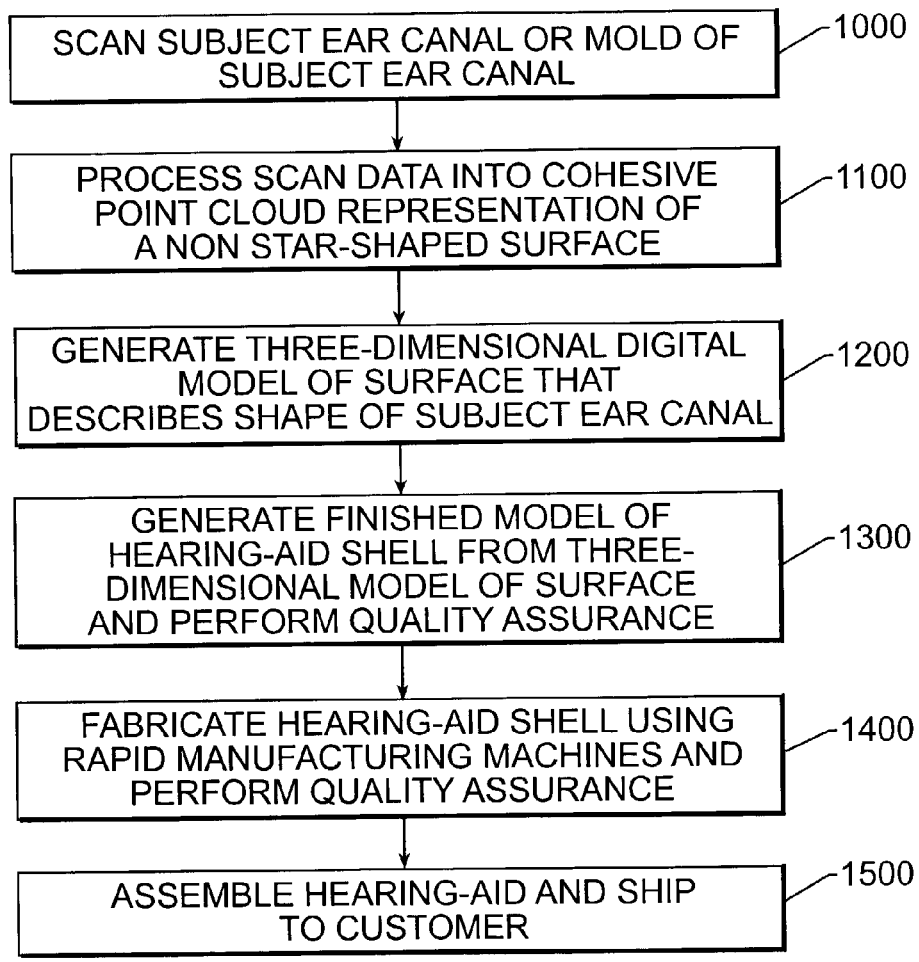
FIG. 23 is a flow diagram of operations that illustrate preferred methods of manufacturing hearing-aid shells in accordance with additional embodiments of the present invention.
Figure 24:
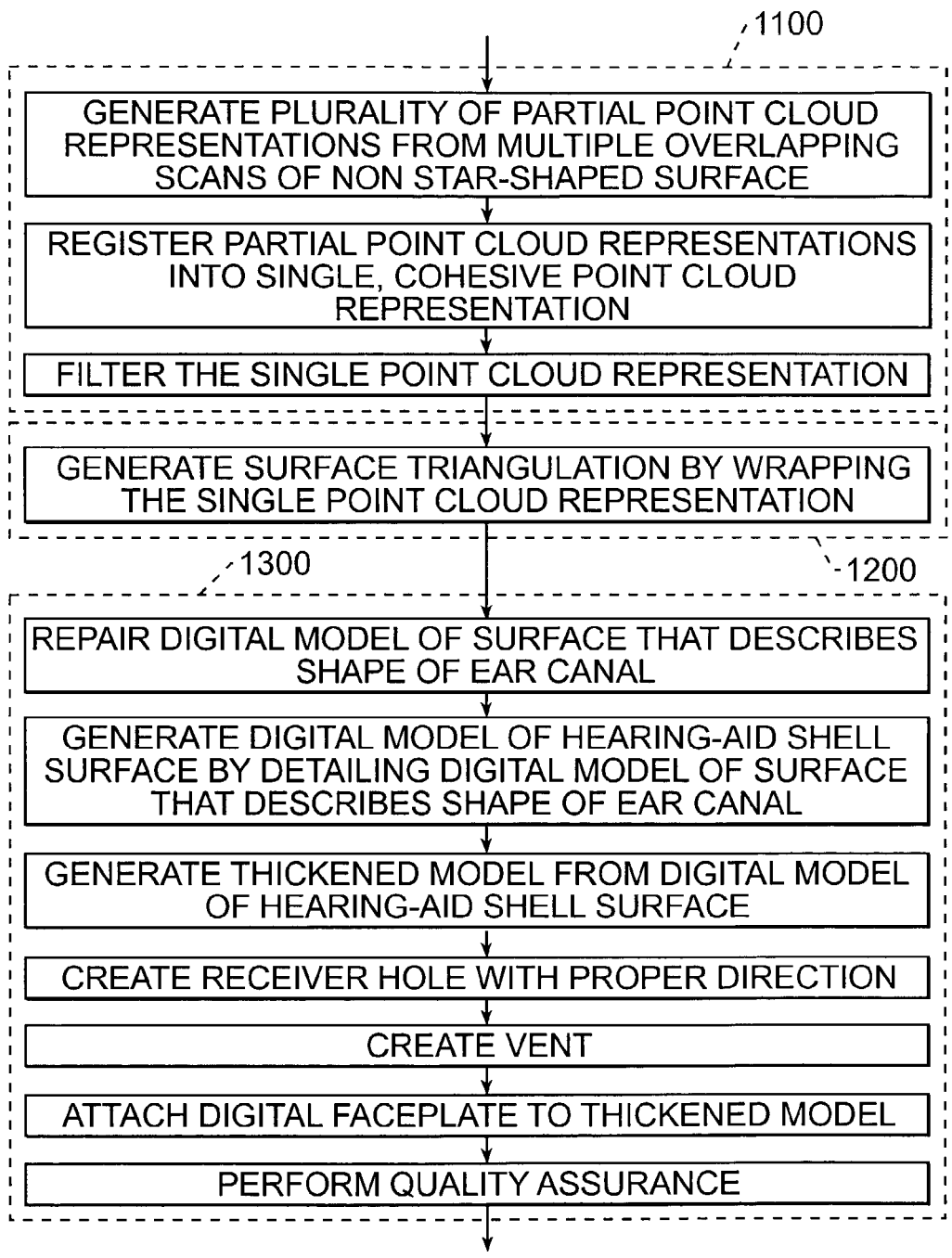
FIG. 24 is a flow diagram of operations that illustrate additional preferred methods of generating a three-dimensional digital model of a hearing-aid shell surface from scan data.

Referring now to FIGS. 23-24, additional preferred manufacturing methods and systems for rapid production of hearing-aid shells may include operations 1000 to scan a subject ear canal or mold (e.g., raw or trimmed impression) of the subject ear canal. Operations to scan a raw impression are typically more challenging than scanning a trimmed impression that is already in the shape of a standard hearing-aid shell. The reason is that the raw impressions are usually non star-shaped whereas trimmed impressions are often, but not always, star shaped. Non star-shaped raw impression surfaces are typically difficult to scan because they frequently contain occlusions. To address this difficulty, irregular overlapping scans of a surface of a non star-shaped impression surface are typically necessary to adequately describe the surface with a sufficiently high and uniform density of data points. The scanning operations are then followed with operations 1100 to process the multiple scans into a single, cohesive point cloud representation of a non star-shaped surface. The scanning and processing operations 1000 and 1100 may require registering multiple scans of a subject ear canal or mold of the subject ear canal into a single, cohesive point cloud using partial and global alignment operations. Filtering operations may then be performed on the point cloud to reduce high frequency noise, remove outliers by identifying and eliminating sufficiently far points and remove overlaps. Other techniques may also be used to generate a cohesive point cloud representation from captured data that is derived independent of scanning operations.

Operations 1200 are then performed to generate a three-dimensional model of a surface that describes the shape of at least a portion of the subject ear canal, from the point cloud representation. These operations may include automated wrapping operations, such as those described in the aforementioned and commonly assigned U.S. application Ser. No. 09/248,587, now U.S. Pat. No. 6,377,865, the disclosure of which is hereby incorporated herein by reference. The automated wrapping operations are performed to triangulate the point cloud (i.e., 3D point set) into a surface triangulation that is also typically non star-shaped. These wrapping operations may rely exclusively on the Cartesian coordinates of the data points in the point cloud and, therefore, may be performed in the absence of connectivity information.

For example, preferred wrapping operations may include determining a plurality of stars from a plurality of points $p_i$ in a 3D point set S that at least partially describes a 3D surface, by projecting the plurality of points $p_i$ onto planes $T_i$ that are each estimated to be tangent about a respective one of the plurality of points $p_i$. Weights, which are based on projection distance (e.g., (projection distance)$^2$), are also preferably assigned to each projected point so that subsequent operations to merge triangles and edges result in fewer conflicts and, therefore, fewer holes in resulting digital models. The plurality of stars are then merged into the surface triangulation.

The operations to determine a plurality of stars may include identifying a respective subset of near points $S_i$ for each of the plurality of points $p_i$ and projecting a plurality of points $p_j$ in each subset of near points $S_i$ to a respective estimated tangent plane $T_i$. In particular, for each of a plurality of estimated tangent planes, $T_i$, a star of the projection of a respective point $p_i$ onto the estimated tangent plane $T_i$ is determined. The star of the projection of a respective point $p_i$ onto the estimated tangent plane $T_i$ constitutes a two-dimensional (2D) Delaunay triangulation (e.g., 2D Delaunay triangulation). The plurality of stars are then merged into a model of the 3D surface. The merging operation may also include eliminating edges and triangles from the plurality of stars that are in conflict and merging nonconflicting edges and triangles into a surface triangulation. The merging operation may include sorting triangles within the plurality of stars and removing those sorted triangles that are not in triplicate. The sorted triangles that have not been removed are then connected to define a triangulated pseudomanifold as a two-dimensional simplicial complex in which edges and triangles of a star that share a vertex form a portion of an open disk. Operations may also be performed to sort edges within the plurality of stars that do not belong to any of the triangles in the triangulated pseudomanifold and remove those sorted edges that are not in duplicate. The sorted edges that have not been removed may then be added to the triangulated pseudomanifold. These wrapping operations are more fully described in commonly assigned U.S. application Ser. No. 10/152,444, filed May 21, 2002, entitled "Methods, Apparatus and Computer Program Products That Reconstruct Surfaces from Data Point Sets," the disclosure of which is hereby incorporated herein by reference.

Operations to trim and fill holes in the surface triangulation may then be performed. These operations may include filling small holes using a flat hole filling algorithm or filling large holes using a curvature-based hole filling operation. Operations may then be performed to convert the surface triangulation into a 2-manifold with nonzero functional boundary, however, these operations may be delayed to a later stage in the automated process. Mesh improvement operations may also be performed to optimize the surface triangulation. Operations to check for and remove self-intersections are also preferably performed. Preferred operations to check for self-intersections are more fully described in an article by A. Zomorodian and H. Edelsbrunner, entitled "Fast Software for Box Intersections", Proc. of the ACM Symposium on Computational Geometry, Hong Kong, June (2000), the disclosure of which is hereby incorporated herein by reference.

Operations 1300 are then performed to generate a finished model of a hearing-aid shell from the surface triangulation. At a commencement of these operations, the surface triangulation may undergo surface repair operations. These repair operations may include a de-feature operation to replace cavities and bumps by smooth surfaces that observe neighboring curvature constraints. These cavities and bumps may be present in the raw or trimmed impression that was scanned. These repair operations may also include relaxing operations to remove wrinkles and smoothing operations that may include subdividing the surface triangulation. If necessary, a canal tip may be added to the surface triangulation by merging the surface triangulation with a predefined template or by deforming the surface interactively to define the canal tip.

For quality assurance purposes, a digital full ear cast may be generated by selecting a digital model of a cast form (e.g., cylinder) from a predefined library of cast forms using an interactive software tool menu. The cylinder may be rendered as a "transparent" surface (with outline) on a display of a CAD workstation to simulate the silicon full ear cast used in traditional manual processes. The digital full ear cast is generated by subtracting a volume bounded by the surface triangulation from the digital model of the cast form using a Boolean operation. Alternatively, the surface triangulation may itself be used for quality assurance purposes by comparing it against the thickened model of the hearing-aid shell and/or a surface model derived from scanning the printed shell. The quality assurance operations may be performed at each stage in the modeling and manufacturing process.

The operations 1300 to generate a finished model of a hearing-aid shell surface from the point cloud representation also preferably include operations to detail the surface triangulation. In the conventional manual processes, the steps to manually detail an impression are often, the most time consuming and skill intensive. The preferred operations to detail the surface triangulation preferably include a set of software based operations that are fast, intelligent and intuitive and enable the generation of a resulting three-dimensional digital model of a hearing-aid shell surface from the surface triangulation. There are five main types of hearing-aid shells. These include in-the-ear (ITE), which may be full or half, in-the-canal (ITC), which may be standard or mini, and completely-in-the-canal (CIC). The software based operations include a "cut open" operation that enables the surface triangulation to be cut and leaves a hole in the location of the cut. A "cut sealed" operation simulates the cutting of a piece of a solid object (e.g., silicon clay), by cutting the surface triangulation without leaving a hole in the location of the cut operation. A "bevel" operation is provided for rounding sharp edges of the surface triangulation. A "round" operation rounds the entire area after a cut operation, with the resulting surface being below the cut surface. A "taper" operation combines the "cut sealed" and "round" operations, and is typically used to define a canal tip. A "flare" operation reduces protruding surfaces and a "trim helix area" operation combines a "cut" operation (at a prescribed angle) and a round operation. An operation may also be provided to cut and trim the resulting shell surface using a faceplate as a guide. Intelligent constraints that operate as rules may also be embedded in the software to provide efficiency in cutting and trimming. Such rules may enable the simultaneous performance of multiple simultaneous cutting and trimming operations. Depending on the type of shell to be produced, a pre-defined library of templates and/or constraints, such as those illustrated and described above with respect to FIGS. 3D-3E, may be used to assist in the performance of multiple cutting operations by calling forth a sequence of the above-described detail operations. When angle and size rules are available, cutting and trimming operations can be defined precisely by these rules (e.g., parallel to the canal tip, 45-60 degrees from the base, etc.). The detailing operations may also include adding bar code, serial number and other identifying information to the digital model of the shell surface.

Figure 25:
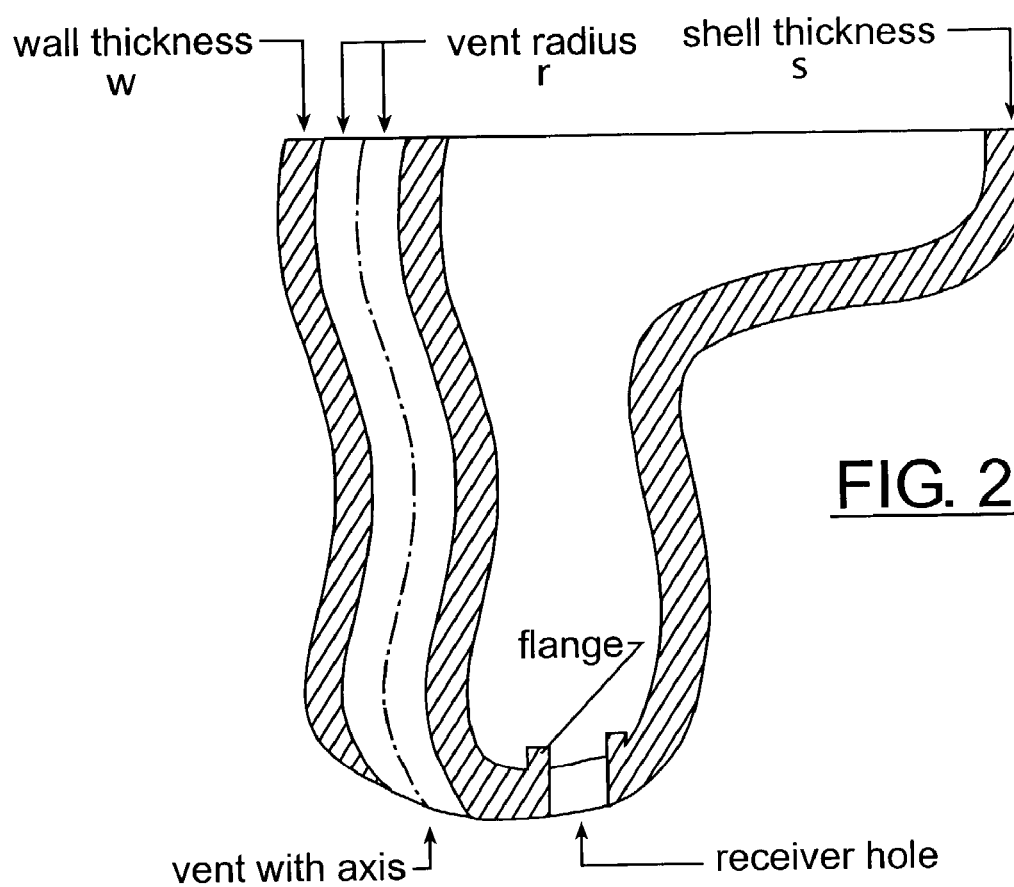
FIG. 25 is a cross-sectional view of a finished hearing-aid shell. The shaded area indicates wall and shell thickness. The vent is a relatively long tunnel routed through the shell. The receiver hole is a short tunnel that may include an interior flange to which hearing-aid components can be aligned and mounted.

The operations to detail the surface triangulation result in the generation of a three-dimensional digital model of a hearing-aid shell surface. Automated operations are then performed to generate a thickened model of a hearing-aid shell from the detailed surface triangulation. These operations, which may include those described above with respect to FIGS. 2-22, may also include operations to create a digital receiver hole as a cylinder or other shape in the thickened model. The digital receiver hole preferably has a central axis that is aligned with a center axis of the canal tip of the shell surface. The center axis may not be defined unambiguously, but can be computed unambiguously by optimization methods. The orientation of the receiver hole should be consistent with the anticipated position and placement of internal electrical components within a resulting printed shell. As illustrated by FIG. 25, which is similar to the cross-sectional view of FIG. 5, the receiver hole can also extend beyond the thickness of the shell into the empty space within the shell. In this manner, the receiver hole may provide a mounting flange to which mechanical and/or electrical components may be attached in a final printed shell. The automated operations 1300 may also include vent generation operations, if necessary. In addition to the preferred vent generation operations described above with respect to FIGS. 2-22, additional vent generation operations may include generating a thickened vent tube surface and merging the cylindrical volume of the thickened vent tube surface with the thickened shell model using a Boolean union operation. The empty canal passing through the thickened vent tube surface may also be removed from the thickened shell model using a Boolean subtraction operation. In the event this technique of vent generation is used, the above-described thickening operations may be limited to uniform shell thickening operations.

The vent location may need to yield to the placement of the receiver hole because there typically is less flexibility in the placement of the receiver hole. This is because the placement of the receiver hole is often dictated by the size and arrangement of electrical components to be added to the resulting printed shell. In alternative embodiments, the shape of the vent need not be circular and need not be limited to a circular tube sweeping a directed path on the shell surface. Color information may also added to the outer shell model so that upon printing the color of the outer shell will match the skin color of the user.

As illustrated by Block 1400, the thickened model is then printed in three-dimensions as a physical hearing-aid shell. This printing operation may include printing both the hearing-aid shell and faceplate (with opening therein to which a battery door can be mounted) together as a unitary finished shell. To achieve this, digital operations may be performed to digitally fit and trim a digital faceplate to the thickened model and automatically create a vent opening in the digital faceplate, prior to printing. Alternatively, operations may be performed to output data that describes a shape of a trim curve that is consistent with the shape of the rim of the thickened model of the hearing-aid shell. An exemplary rim R is illustrated by FIG. 15. This trim curve can then be used by a computer-controlled cutting tool to automatically cut a mating faceplate from a generic faceplate form. The mating faceplate can then be glued to a printed shell and manually trimmed. Quality assurance operations may also be performed at this stage and throughout the manufacturing process. As described above, these quality assurance operations may include performing quality assurance by comparing two or more of (i) a digital model derived from a scan of the printed hearing-aid shell, (ii) the three-dimensional digital model of a star-shaped hearing-aid shell surface, (iii) the non-star shaped surface triangulation and (iv) a digital full-ear cast.

Operations to perform fabrication and order fulfillment control may also be performed. For example, software operations may be performed that enable the printing of multiple hearing-aid shells side-by-side on a supporting tray, with the placement and orientation of each shell on the tray being dictated by an algorithm that maximizes the packing density of the tray. Serial number and bar code information may also be embossed on the shells prior to removal from a supporting tray, if not already merged with the digital model prior to printing.

Figure 4B:
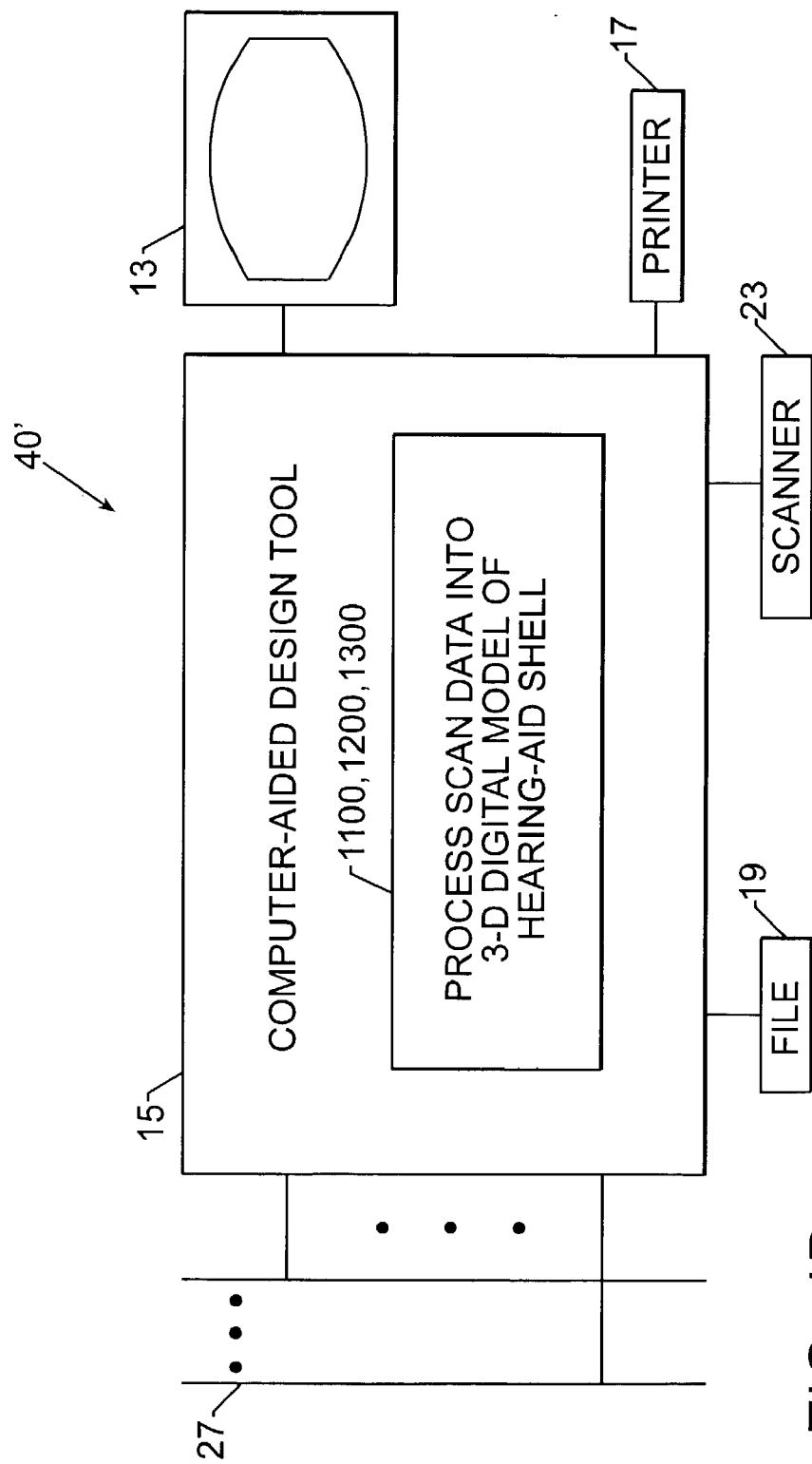
FIG. 4B is a second general hardware description of a computer workstation comprising software and hardware for manufacturing hearing-aid shells in accordance with embodiments of the present invention.

Referring now to FIG. 4B, a general hardware description of another custom CAD/CAM workstation 40' is illustrated as comprising software and hardware components that perform the above-described operations illustrated by FIGS. 23-34. This workstation 40', which may be used as part of an automated hearing-aid shell manufacturing system, preferably comprises a computer-readable storage medium having computer-readable program code embodied in the medium. This computer-readable program code is readable by one or more processors within the workstation 40' and tangibly embodies a program of instructions executable by the processor to perform the operations described herein and illustrated by the accompanying figures.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of manufacturing an in-the-ear shell, comprising the steps of:
   automatically generating a first three-dimensional digital model of a surface that describes a shape of an ear canal of a subject as a 2-manifold surface having zero or nonzero functional boundary, from captured three-dimensional data;
   generating a second three-dimensional digital model of a thickened in-the-ear shell from the first three-dimensional digital model;
   printing the second three-dimensional digital model as an in-the-ear shell; and
   performing quality assurance by comparing at least two of the first three-dimensional digital model, the second three-dimensional digital model and a third three-dimensional digital model derived from the printed in-the-ear shell.

2. The method of claim 1, wherein said step of performing quality assurance comprises comparing at least two of the first three-dimensional digital model, the second three-dimensional digital model and a third three-dimensional digital model derived from a scan of the printed in-the-ear shell.

3. The method of claim 2, wherein said step of generating a first three-dimensional digital model comprises:
   generating a point cloud representation of a non star-shaped surface that describes the shape of an ear canal of a subject, from multiple point sets that described respective portions of the non star-shape surface; and
   automatically wrapping the point cloud representation into a non star-shaped surface triangulation.

4. The method of claim 3, wherein said step of automatically wrapping the point cloud representation into a non star-shaped surface triangulation comprises the steps of:
   determining a plurality of stars from a plurality of points in the point cloud by projecting the plurality of points onto planes that are each estimated to be tangent about a respective one of the plurality of points; and
   merging the plurality of stars into the surface triangulation.

5. The method of claim 3, wherein said step of generating a second three-dimensional digital model comprises:
   cutting and/or trimming the non star-shaped surface triangulation into a three-dimensional digital model of a star-shaped in-the-ear shell surface; and
   thickening the digital model of the star-shaped in-the-ear shell surface.

6. The method of claim 5, wherein said thickening step is followed by the steps of:
   defining a receiver hole and/or vent in the thickened digital model; and fitting a digital faceplate to the thickened digital model.

7. The method of claim 6, wherein said printing step comprises printing an in-the-ear shell with integral faceplate from the thickened digital model.

8. The method of claim 6, wherein said printing step comprises printing an in-the-ear shell with integral faceplate using a printing tool selected from the group consisting of a stereolithography tool and a rapid prototyping apparatus.

9. A method of manufacturing an in-the-ear shell, comprising the steps of:
   generating a three-dimensional digital model of an in-the-ear shell surface from scan data; and
   generating a thickened model of the in-the-ear shell from the three-dimensional digital model of an in-the-ear shell surface.

10. The method of claim 9, wherein said step of generating a three-dimensional digital model of an in-the-ear shell surface from scan data comprises the steps of:
    determining a plurality of stars from a plurality of points in the scan data by projecting the plurality of points onto planes that are each estimated to be tangent about a respective one of the plurality of points; and
    merging the plurality of stars into a surface triangulation.

11. The method of claim 9, wherein said step of generating a thickened model comprises generating a thickened model of the in-the-ear shell having a digital representation of a receiver hole therein, from the three-dimensional digital model of an in-the-ear shell surface.

12. The method of claim 9, wherein said step of generating a three-dimensional digital model of an in-the-ear shell surface is preceded by the step of generating the scan data as a point cloud representation of a non star-shaped surface that describes a shape of an ear canal.

13. The method of claim 12, wherein said step of generating a three-dimensional digital model of an in-the-ear shell surface comprises generating a three-dimensional digital model of an in-the-ear shell surface as a 2-manifold surface having a nonzero functional boundary.

14. The method of claim 12, wherein said step of generating a three-dimensional digital model of ah in-the-ear shell surface comprises processing the point cloud representation of a non star-shaped surface using an automated wrap function that, independent of information in excess of the Cartesian coordinates of the points in the point cloud representation, converts the point cloud representation into the three-dimensional digital model of an in-the-ear shell surface.

15. The method of claim 13, wherein said step of generating a three-dimensional digital model of an in-the-ear shell surface comprises processing the point cloud representation of a non star-shaped surface using an automated wrap function that, independent of information in excess of the Cartesian coordinates of the points in the point cloud representation, converts the point cloud representation into the three-dimensional digital model of an in-the-ear shell surface.

16. The method of claim 12, wherein said step of generating a three-dimensional digital model of an in-the-ear shell surface comprises processing the point cloud representation of a non star-shaped surface using an automated wrap function that, independent of connectivity information linking points in the point cloud representation by edges and triangles, converts the point cloud representation into the three-dimensional digital model of an in-the-ear shell surface.

17. The method of claim 13, wherein said step of generating a three-dimensional digital model of an in-the-ear shell surface comprises processing the point cloud representation of a non star-shaped surface using an automated wrap function that, independent of connectivity information linking points in the point cloud representation by edges and triangles, converts the point cloud representation into the three-dimensional digital model of an in-the-ear shell surface.

18. A method of manufacturing a hearing-aid, shell, comprising the steps of:
generating scan data as a point cloud representation of a non star-shaped surface that describes a shape of an ear canal;
generating a three-dimensional digital model of a hearing-aid shell surface from scan data by:
processing the point cloud representation using a wrap function that, independent of connectivity information linking points in the point cloud representation by edges and triangles, automatically converts the point cloud representation into a surface triangulation; and
converting the surface triangulation into the three-dimensional digital model of a hearing-aid shell surface, by cutting, trimming and/or otherwise detailing the surface triangulation; and generating a thickened model of the hearing-aid shell from the three-dimensional digital model of a hearing-aid shell surface.

19. The method of claim 18, wherein said step of processing the point cloud representation comprises the steps of:
determining a plurality of stars from a plurality of points in the scan data by projecting the plurality of points onto planes that are each estimated to be tangent about a respective one of the plurality of points; and
merging the plurality of stars into the surface triangulation.

20. The method of claim 18, wherein said step of generating a thickened model comprises generating a thickened model of the hearing aid shell having a digital representation of a receiver hole therein.

21. A method of manufacturing a hearing-aid shell, comprising the steps of:
generating a three-dimensional digital model of a hearing-aid shell surface from scan data; and
generating a thickened model of the hearing-aid shell that comprises a digital representation of a receiver hole therein and a digital representation of a mounting flange that surrounds the receiver hole and extends into an interior of the thickened model, from the three-dimensional digital model of a hearing-aid shell surface.

22. The method of claim 21, wherein said step of generating a three-dimensional digital model of a hearing-aid shell surface comprises generating a surface triangulation from the scan data and generating a digital hill ear cast from the surface triangulation.

23. The method of claim 22, wherein said step of generating a digital full car cast comprises subtracting a volume bounded by the surface triangulation from a digital model of a cast form using a Boolean operation.

24. The method of claim 21, wherein said step of generating a thickened model of the hearing-aid shell comprises generating a thickened digital model of the hearing-aid shell with integral faceplate and vent hole extending through the faceplate.

25. The method of claim 21, further comprising the step of generating a trim curve that identifies a shape of a rim of the thickened model of the hearing-aid shell.

26. The method of claim 25, further comprising the step of cutting a faceplate form along a path defined by the trim curve.

27. A method of manufacturing a hearing-aid shell, comprising the steps of:
generating a point cloud representation of a non star-shaped surface that describes a shape of an car canal, from multiple partial scans of the non star-shape surface; and
generating a three-dimensional digital model of a hearing-aid shell surface from the point cloud representation by:
processing the point cloud representation using a wrap function that, independent of connectivity information linking points in the point cloud representation by edges and triangles, automatically converts the point cloud representation into a surface triangulation; and
converting the surface triangulation into the three-dimensional digital model of a hearing-aid shell surface.

28. The method of claim 27, wherein said step of processing the point cloud representation comprises the steps of:
determining a plurality of stars from a plurality of points in the point cloud representation by projecting the plurality of points onto planes that are each estimated to be tangent about a respective one of the plurality of points; and
merging the plurality of stars into the surface triangulation.

29. The method of claim 27, wherein said converting step comprising digitally cutting and/or digitally trimming the surface triangulation at least until the three-dimensional digital model of a hearing-aid shell surface is star-shaped.

30. The method of claim 27, wherein said step of generating a point cloud representation of a non star-shaped surface comprises filtering the point cloud representation to remove high frequency noise and outliers.

31. The method of claim 27, wherein said step of generating a point cloud representation of a non star-shaped surface comprises generating a plurality of partial point cloud representations from the multiple partial scans of the non star-shape surface and registering the plurality of partial point cloud representations into a single, cohesive a point cloud representation.

32. A method of manufacturing a hearing-aid shell, comprising the steps of:
generating a point cloud representation of a non star-shaped surface that describes a shape of an car canal, from multiple overlapping scans of the non star-shape surface; and
generating a three-dimensional digital model of a hearing-aid shell surface from the point cloud representation by:
processing the point cloud representation using a wrap function that converts the point cloud representation into a surface triangulation; and
converting the surface triangulation into the three-dimensional digital model of a hearing-aid shell surface that is star-shaped.

33. The method of claim 32, wherein said step of processing the point cloud representation comprises the steps of:
determining a plurality of stars from a plurality of points in the point cloud representation by projecting the plurality of points onto planes that are each estimated to be tangent about a respective one of the plurality of points; and
merging the plurality of stars into the surface triangulation.

34. The method of claim 32, wherein said step of generating a point cloud representation of a non star-shaped surface comprises filtering the point cloud representation to remove high frequency noise and outliers.

35. The method of claim 32, wherein said step of generating a point cloud representation of a non star-shaped surface comprises:
- generating a plurality of partial point cloud representations from the multiple overlapping scans of the non star-shape surface; and
- registering the plurality of incomplete point cloud representations into a cohesive a point cloud representation.

36. A method of manufacturing a hearing-aid shell, comprising the steps of:
- generating a point cloud representation of a non star-shaped surface that describes a shape of an ear canal, from multiple partial scans of the non star-shape surface;
- wrapping the point cloud representation into a non star-shaped surface triangulation;
- cutting and/or trimming the non star-shaped surface triangulation into a three-dimensional digital model of a star-shaped hearing-aid shell surface;
- thickening the digital model of the star-shaped hearing-aid shell surface;
- printing the thickened digital model of the star-shaped hearing-aid shell surface as a hearing-aid shell; and
- performing quality assurance by comparing two or more of a digital model derived from a scan of the printed hearing-aid shell, the three-dimensional digital model of a star-shaped hearing-aid shell surface, the non-star shaped surface triangulation and a digital full-ear cast.

* * * * *